US012583579B2

(12) United States Patent
Vaidya et al.

(10) Patent No.: US 12,583,579 B2
(45) Date of Patent: Mar. 24, 2026

(54) SYSTEMS AND METHODS FOR FLIGHT CONTROL OF AIRCRAFT

(71) Applicant: Archer Aviation Inc., San Jose, CA (US)

(72) Inventors: Abhishek Vaidya, San Jose, CA (US); Nathan Thomas Depenbusch, Mountain View, CA (US); Jenner Grey Richards, Sunnyvale, CA (US); Fernanda Aline Matta De Paiva, Los Altos Hills, CA (US)

(73) Assignee: Archer Aviation Inc., San Jose, CA (US)

( * ) Notice: Subject to any disclaimer, the term of this patent is extended or adjusted under 35 U.S.C. 154(b) by 30 days.

(21) Appl. No.: 18/614,202

(22) Filed: Mar. 22, 2024

(65) Prior Publication Data

US 2024/0400213 A1 Dec. 5, 2024

Related U.S. Application Data

(60) Provisional application No. 63/504,958, filed on May 30, 2023.

(51) Int. Cl.
B64C 29/00 (2006.01)
B64C 11/46 (2006.01)
(Continued)

(52) U.S. Cl.
CPC .......... B64C 29/0033 (2013.01); B64C 11/46 (2013.01); B64C 13/50 (2013.01);
(Continued)

(58) Field of Classification Search
None
See application file for complete search history.

(56) References Cited

U.S. PATENT DOCUMENTS 5,001,646 A        3/1991   Caldwell et al.
5,839,690 A   *   11/1998   Blanchette ............ B64C 39/001
                                                                   244/6
(Continued)

FOREIGN PATENT DOCUMENTS

EP            3891067 B1        1/2024
WO       2020180373 A2        9/2020
WO       2020240567 A1      12/2020

OTHER PUBLICATIONS

International Search Report and Written Opinion of the International Search Authority in International Application No. PCT/US2024/021149 dated Jul. 9, 2024 (10 pages).
(Continued)

*Primary Examiner* — William L Gmoser
(74) *Attorney, Agent, or Firm* — Finnegan, Henderson, Farabow, Garrett & Dunner, LLP

(57) ABSTRACT

Aspects of the present disclosure generally relate to systems and methods for flight control of aircrafts driven by electric propulsion systems and in other types of vehicles. In some embodiments, an aircraft is disclosed, comprising: at least one electric propulsion unit; at least one sensor configured to measure at least one aircraft condition; and at least one flight control computer configured to dynamically vary at least one torque command to the at least one electric propulsion unit based at least on the at least one aircraft condition; wherein the at least one electric propulsion unit is configured to generate thrust based on the at least one dynamically varied torque command.

34 Claims, 22 Drawing Sheets

(51) Int. Cl.
| | |
|---|---|
| *B64C 13/50* | (2006.01) |
| *B64D 27/34* | (2024.01) |
| *B64D 45/00* | (2006.01) |
| *G01C 23/00* | (2006.01) |

(52) U.S. Cl.
CPC ............. *B64D 27/34* (2024.01); *B64D 45/00* (2013.01); *G01C 23/005* (2013.01); *B64D 2221/00* (2013.01)

(56) References Cited

U.S. PATENT DOCUMENTS

| | | | |
|---|---|---|---|
| 5,890,441 | A * | 4/1999 | Swinson ............... B64C 39/024 |
| | | | 244/12.3 |
| 9,764,833 | B1 | 9/2017 | Tighe et al. |
| 9,898,033 | B1 | 2/2018 | Long |
| 10,364,036 | B2 | 7/2019 | Tighe et al. |
| 10,399,673 | B1 * | 9/2019 | Roop ........................ B64C 3/30 |
| 10,450,062 | B1 * | 10/2019 | Bova ..................... B64U 30/10 |
| 11,142,333 | B1 | 10/2021 | Richter et al. |
| 11,216,012 | B2 * | 1/2022 | Youmans ................ B64C 17/02 |
| 11,299,287 | B1 * | 4/2022 | Moy ........................ B64C 11/00 |
| 11,407,506 | B2 | 8/2022 | Poh et al. |
| 11,411,474 | B1 | 8/2022 | White et al. |
| 11,427,305 | B1 * | 8/2022 | Wiegman ............. G05D 1/0055 |
| 11,640,179 | B2 | 5/2023 | Zwiener et al. |
| 11,932,386 | B2 * | 3/2024 | Baharav .................. B64C 39/04 |
| 11,983,017 | B2 | 5/2024 | Seiferth et al. |
| 11,993,370 | B2 * | 5/2024 | Wu ....................... B64C 39/024 |
| 12,330,783 | B1 * | 6/2025 | Szmuk ................... G05D 1/611 |
| 2002/0153452 | A1 | 10/2002 | King et al. |
| 2004/0093130 | A1 | 5/2004 | Osder et al. |
| 2010/0076625 | A1 | 3/2010 | Yoeli |
| 2013/0138270 | A1 | 5/2013 | Christensen et al. |
| 2015/0344134 | A1 * | 12/2015 | Cruz Ayoroa ...... B64C 29/0033 |
| | | | 244/48 |
| 2016/0229547 | A1 * | 8/2016 | Fisher ................... B64C 11/303 |
| 2019/0291862 | A1 | 9/2019 | Lyasoff et al. |
| 2019/0332125 | A1 | 10/2019 | Irwin, III et al. |
| 2020/0277073 | A1 | 9/2020 | Thomassin et al. |
| 2020/0333805 | A1 | 10/2020 | English et al. |
| 2021/0309392 | A1 * | 10/2021 | Wiegman ............... B64D 31/16 |
| 2021/0331794 | A1 * | 10/2021 | Burns ....................... B64C 9/00 |
| 2021/0350046 | A1 | 11/2021 | Bosson et al. |
| 2022/0315205 | A1 * | 10/2022 | Moy .................... G05D 1/0858 |
| 2022/0334595 | A1 | 10/2022 | Famularo et al. |
| 2023/0312119 | A1 * | 10/2023 | Eto ..................... B64C 29/0025 |
| | | | 701/16 |
| 2023/0382546 | A1 * | 11/2023 | Freiheit .................. B64C 11/50 |
| 2024/0059409 | A1 * | 2/2024 | Tonet Fleig .......... G05D 1/485 |
| 2024/0175400 | A1 * | 5/2024 | Zatorski ................ B64D 27/24 |
| 2024/0183316 | A1 * | 6/2024 | Park ......................... F02C 9/56 |
| 2024/0199225 | A1 * | 6/2024 | Cole .................. B64D 11/0689 |

OTHER PUBLICATIONS

Walker, G., et al., "F-35B Integrated Flight-Propulsion Control Development", 2013 international powered lift conference, 2013, 15 pages.

Vigano, L., et al., "Development of augmented control laws for a tilt rotor in low and high speed flight modes", European Rotorcraft Forum, 2017, 14 pages.

Denham, J., et al., "Converging on a precision Hover control strategy for the F-35B STOVL aircraft.", AIAA Guidance, Navigation and Control Conference and Exhibit, 2006, 13 pages.

Whittle, R., "Flying The Osprey Is Not Dangerous, Just Different: Veteran Pilots", Breaking Defense, Sep. 5, 2012, 11 pages.

Kang, Y., et al., "Development of flight control system and troubleshooting on flight test of a tilt-rotor unmanned aerial vehicle", International Journal of Aeronautical and Space Sciences 17.1, 2016, p. 120-131, 12 pages.

* cited by examiner

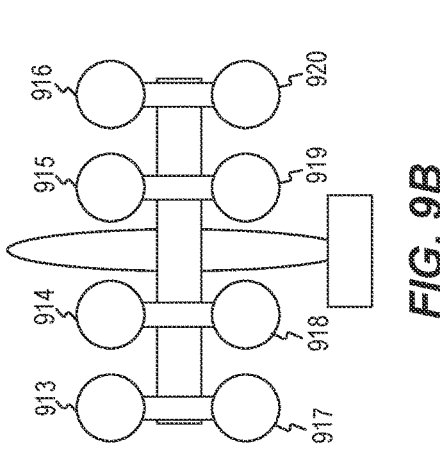
FIG. 9B
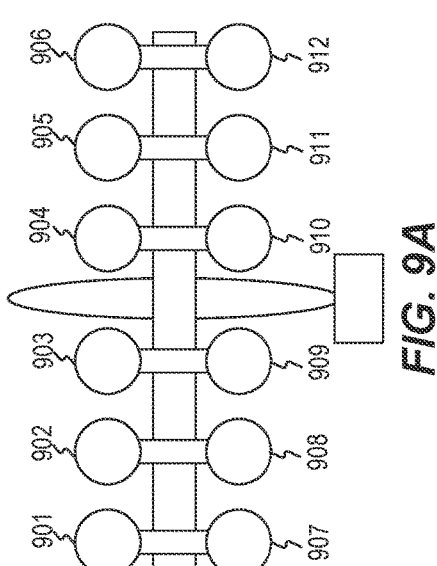
FIG. 9A
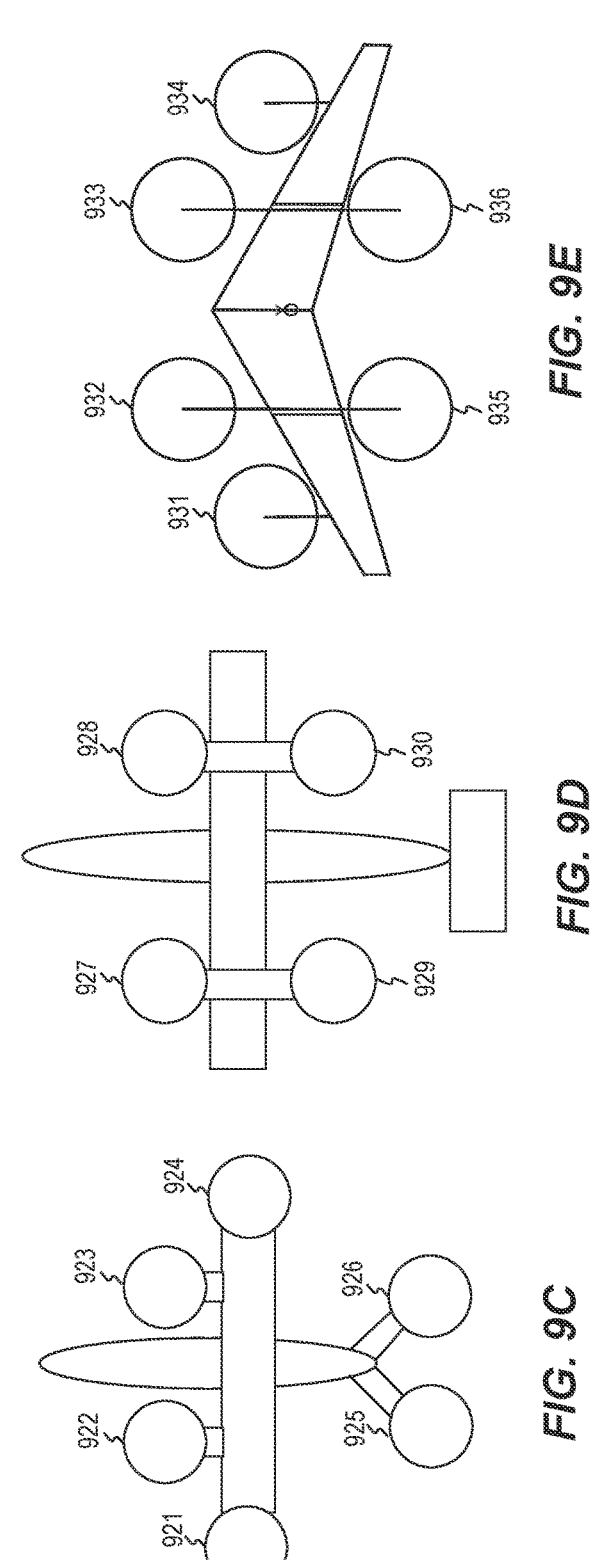
FIG. 9E
FIG. 9D
FIG. 9C

1500

Measuring an aircraft condition                                    1502

Dynamically varying a torque command to the propulsion unit based at least on the aircraft condition                                    1504

Generating thrust based on the dynamically varied torque command                                    1506

SYSTEMS AND METHODS FOR FLIGHT CONTROL OF AIRCRAFT

CROSS-REFERENCE TO RELATED APPLICATIONS

This disclosure claims priority to U.S. Provisional Application No. 63/504,958, titled "SYSTEMS AND METHOD FOR FLIGHT CONTROL OF EVTOL AIRCRAFT," filed May 30, 2023, the contents of which are incorporated herein in their entirety for all purposes.

TECHNICAL FIELD

This disclosure relates generally to powered aerial vehicles. More particularly, and without limitation, the present disclosure relates to innovations in aircrafts driven by electric propulsion systems. Certain aspects of the present disclosure generally relate to systems and methods for flight control of aircrafts driven by electric propulsion systems and in other types of vehicles, as well as flight control of aircrafts in flight simulators and video games. Other aspects of the present disclosure generally relate to improvements in flight control systems and methods that provide particular advantages in aerial vehicles and may be used in other types of vehicles.

BACKGROUND

The inventors here have recognized several problems that may be associated with flight control of aircraft, including a tilt-rotor aircraft that uses electrical or hybrid-electric propulsion systems (hereinafter referred to as electric propulsion units or "EPUs"). For example, for aircrafts relying on changing propeller speed to change thrust for primary or secondary control of its dynamics, the rate and bandwidth at which propeller speed can be changed may be critical. If bandwidth is too low, the aircraft may have difficulty in rejecting exogenous disturbances and may appear slow to respond or unresponsive to a pilot or outer loop control system, which can lead to decreased aircraft stability and safety.

Therefore, there is a need for improved systems and methods for aircrafts to achieve a fast engine response.

SUMMARY

The present disclosure relates generally to flight control of electric aircraft and other powered aerial vehicles. More particularly, and without limitation, the present disclosure relates to innovations in tilt-rotor aircraft that use electrical propulsion systems. For example, certain aspects of the present disclosure relate to an aircraft comprising: one or more electric propulsion units; one or more sensors configured to measure one or more aircraft conditions; at least one flight control computer configured to dynamically vary one or more torque commands to the one or more electric propulsion units based at least on the one or more aircraft conditions; wherein the one or more electric propulsion units are configured to generate thrust based on the one or more dynamically varied torque commands.

BRIEF DESCRIPTION OF THE DRAWINGS

FIGS. 9A, 9B, 9C, 9D, and 9E illustrate exemplary top plane views of VTOL aircraft, consistent with disclosed embodiments.

DETAILED DESCRIPTION

Figure 1:
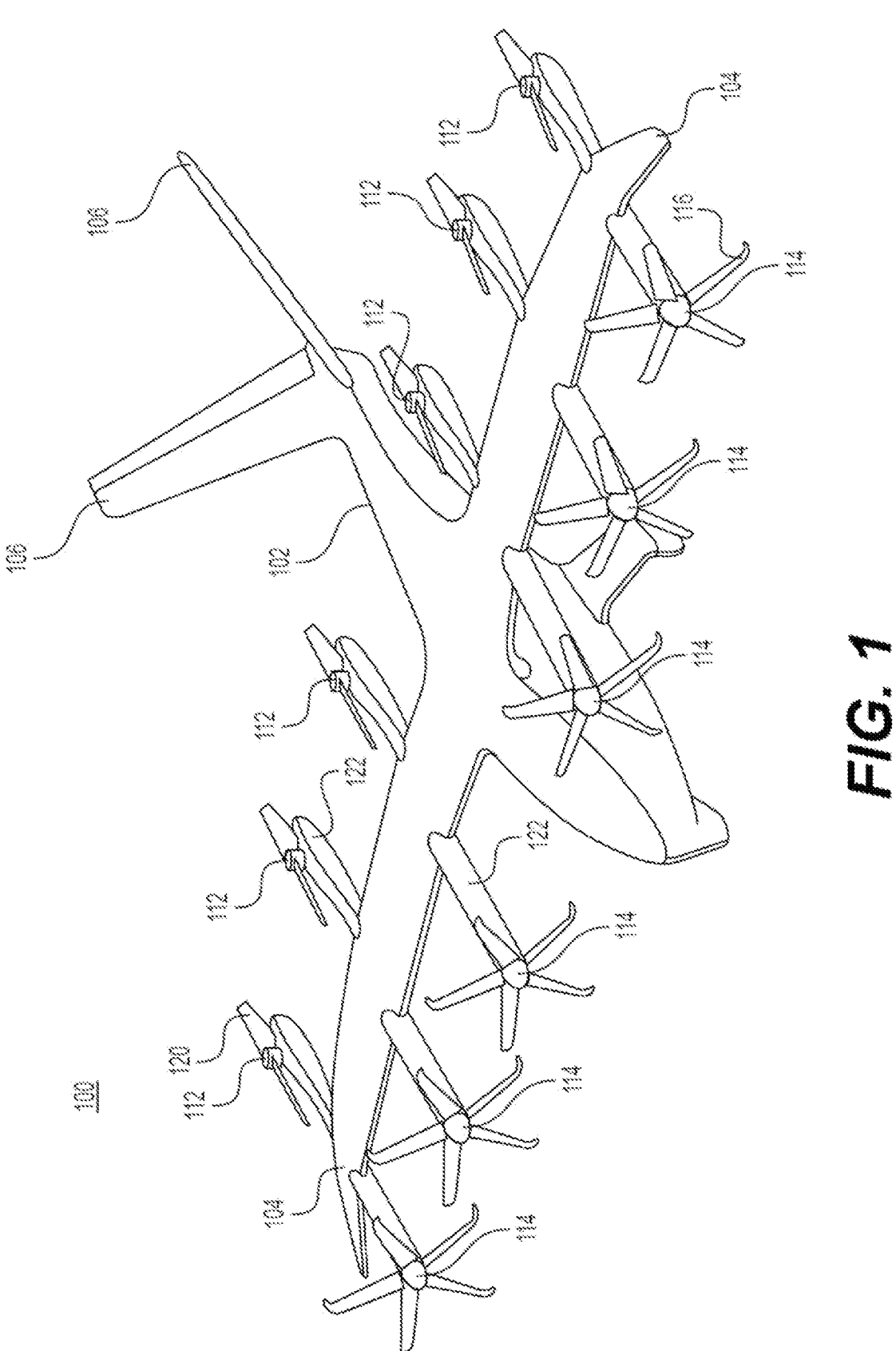
FIG. 1 shows an exemplary VTOL aircraft, consistent with disclosed embodiments.

The present disclosure addresses systems, components, and techniques primarily for use in an aircraft. The aircraft may be an aircraft with a pilot, an aircraft without a pilot (e.g., a UAV), a drone, a helicopter, and/or an airplane. An aircraft includes a physical body and one or more components (e.g., a wing, a tail, a propeller) configured to allow the aircraft to fly. The aircraft may include any configuration that includes at least one propeller. In some embodiments, the aircraft is driven by one or more electric propulsion systems (hereinafter referred to as electric propulsion units or "EPUs"). The aircraft may be fully electric, hybrid, or gas powered. For example, in some embodiments, the aircraft is a tilt-rotor aircraft configured for frequent (e.g., over 50 flights per work day), short-duration flights (e.g., less than 100 miles per flight) over, into, and out of densely populated regions. The aircraft may be configured to carry 4-6 passengers or commuters who have an expectation of a comfortable experience. Accordingly, it is desirable to control the aircraft components (such as EPUs) such that the aircraft remains relatively stable and safe throughout each course of flight.

Disclosed embodiments provide new and improved configurations of aircraft components, some of which are not observed in conventional aircraft, and/or identified design criteria for components that differ from those of conventional aircraft. Such alternate configurations and design criteria, in combination addressing drawbacks and challenges with conventional components, yielded the embodiments disclosed herein for various configurations and designs of components for an aircraft (e.g., electric aircraft or hybrid-electric aircraft) driven by a propulsion system.

In some embodiments, the aircraft driven by a propulsion system of the present disclosure may be designed to be capable of both vertical and conventional takeoff and landing, with a distributed propulsion system enabling vertical flight, horizontal and lateral flight, and transition (e.g., transitioning between vertical flight and horizontal flight). The aircraft may generate thrust by supplying high voltage electrical power to a plurality of engines of the distributed propulsion system, which may include components to convert the high voltage electrical power into mechanical shaft power to rotate a propeller.

Some embodiments include one or more electric engines, each electric engine connected to an onboard electrical power source, which may include a device capable of storing energy such as a battery or capacitor, and may optionally include one or more systems for harnessing or generating electricity such as a fuel powered generator or solar panel array. In some embodiments, the aircraft may comprise a hybrid aircraft using at least one of an electric-based energy source or a fuel-based energy source to power the distributed propulsion system. In some embodiments, the aircraft may be powered by one or more batteries, internal combustion engines (ICE), generators, turbine engines, or ducted fans.

The engines may be mounted directly to the wing, or mounted to one or more booms attached to the wing. The amount of thrust each engine generates may be governed by a torque command from a Flight Control System (FCS) over a digital communication interface to each engine. Embodiments may include forward engines (and associated propellers) that are capable of altering their orientation, or tilt.

The engines may rotate the propellers in a clockwise or counterclockwise direction. In some embodiments, the difference in propeller rotation direction may be achieved using the direction of engine rotation. In other embodiments, the engines may all rotate in the same direction, and gearing may be used to achieve different propeller rotation directions.

In some embodiments, an aircraft may possess quantities of engines in various combinations of forward and aft engine configurations. A forward engine may be considered an engine that is positioned predominantly towards the leading edge of a wing. An aft engine may be considered an engine that is positioned predominantly towards the trailing edge of a wing. For example, an aircraft may possess six forward and six aft engines, five forward and five aft engines, four forward and four aft engines, three forward and three aft engines, two forward and two aft engines, or any other combination of forward and aft engines, including embodiments where the number of forward engines and aft engines are not equivalent.

In some embodiments, for a vertical takeoff and landing (VTOL) mission, the forward and aft engines may provide vertical thrust during takeoff and landing. During flight phases where the aircraft is moving forward, the forward engines may provide horizontal thrust, while the propellers of the aft engines may be stowed at a fixed position in order to minimize drag. The aft engines may be actively stowed with position monitoring.

Transition from vertical flight to horizontal flight and vice-versa may be accomplished via the tilt propeller subsystem. The tilt propeller subsystem may redirect thrust between a primarily vertical direction during vertical flight phase (e.g., hover-phase) to a horizontal or near-horizontal direction during a forward-flight cruising phase, based on a tilt of one or more propellers (e.g., determining directionality of one or more propellers). A variable pitch mechanism may change the forward engine's propeller-hub assembly blade collective angles for operation during phases of flight, such as a hover-phase, transition phase, and cruise-phase. Vertical lift may be thrust in a primarily vertical direction (e.g., during a hover-phase). Horizontal thrust may be thrust in a primarily horizontal direction (e.g., during a cruise-phase).

In some embodiments, in a conventional takeoff and landing (CTOL) mission, the forward engines may provide horizontal thrust for wing-borne take-off, cruise, and landing, and the wings may provide vertical lift. In some embodiments, the aft engines may not be used for generating thrust during a CTOL mission and the aft propellers may be stowed in place. In other embodiments, the aft engines may be used at reduced power to shorten the length of the CTOL takeoff or landing.

As detailed above, embodiments of the aircraft may include many movable structural flight elements that allow pilots to safely control the aircraft. Flight control surfaces (e.g., ailerons, elevators, rudders, etc.) are critical to controlling the positioning of the aircraft. Changes to the orientation of these surfaces changes the airflow and pressure distribution around the aircraft, allowing the pilot to control the movement of the aircraft in three axes of rotation. Similarly, rotation and orientation control of propellers may provide lift support (e.g., lift required for vertical take-off, landing, and hovering) and may provide the forward thrust required to move the aircraft through the air. Thus, the efficient movement of each of these flight elements is critical to the safety and stability of the aircraft.

As further detailed below with reference to FIG. 11, the safety and stability of an aircraft may be influenced by how quickly the aircraft flight elements can compensate for dynamics (e.g., errors, disturbances, changing conditions, failures, etc.). In some embodiments, compensating for dynamics may be achieved with fast thrust response. For example, some aircrafts with fixed RPM engines capable of independent propeller blade pitch control may be configured to achieve fast thrust response by independently controlling propeller blade pitch. However, not all aircrafts may include engines with independent blade pitch control. For example, some aircrafts may be configured such that a pitch of a propeller (e.g., tilt-rotor, proprotor, spinning airfoil capable of functioning as either a propeller or rotor) blade is mechanically linked to, and thus automatically adjusted based on, a position or tilt of the proprotor (e.g., positioned/tilted to provide vertical thrust, positioned/tilted for providing forward thrust during cruise, etc.). For such aircrafts, engine torque may be the only fast actuator capable of achieving fast thrust response.

The disclosed embodiments compute commands to aircraft actuators (e.g., anything that moves, such as electric engines) necessary to stabilize and maneuver the aircraft and to achieve a fast, predictable and consistent response from the aircraft and its actuators. In some embodiments, a flight control system may have more information about the aircraft and the environment than aircraft actuators. Thus, a flight control system may act as an aggregator of information to coordinate the control of actuators in a central location and may be capable of adjusting its commands to better compensate for errors, disturbances, changing conditions, failures, and other dynamic information.

The disclosed embodiments achieve fast, predictable and consistent responses from the aircraft and its actuators with a propulsion unit dynamics compensation protection and stabilization (DCPS) function. For example, the DCPS function may use knowledge of the low-order model of a relevant propeller, engine and, in some cases, gearbox dynamics to calculate a torque required to give a propeller and the resulting thrust a desired response shape to commands. The bandwidth of a propeller connected to an engine may be determined largely by the inertia of rotating components, the gear ratio of the gearbox (if present), the aerodynamics of the propeller, the density altitude of operation, and both the speed and incidence angle of surrounding air. In some embodiments, the DCPS function may compute the torque command output based on physical limits (e.g., torque capability, maximum and minimum rotational speed, etc.).

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the subject matter recited in the appended claims.

Figure 2:
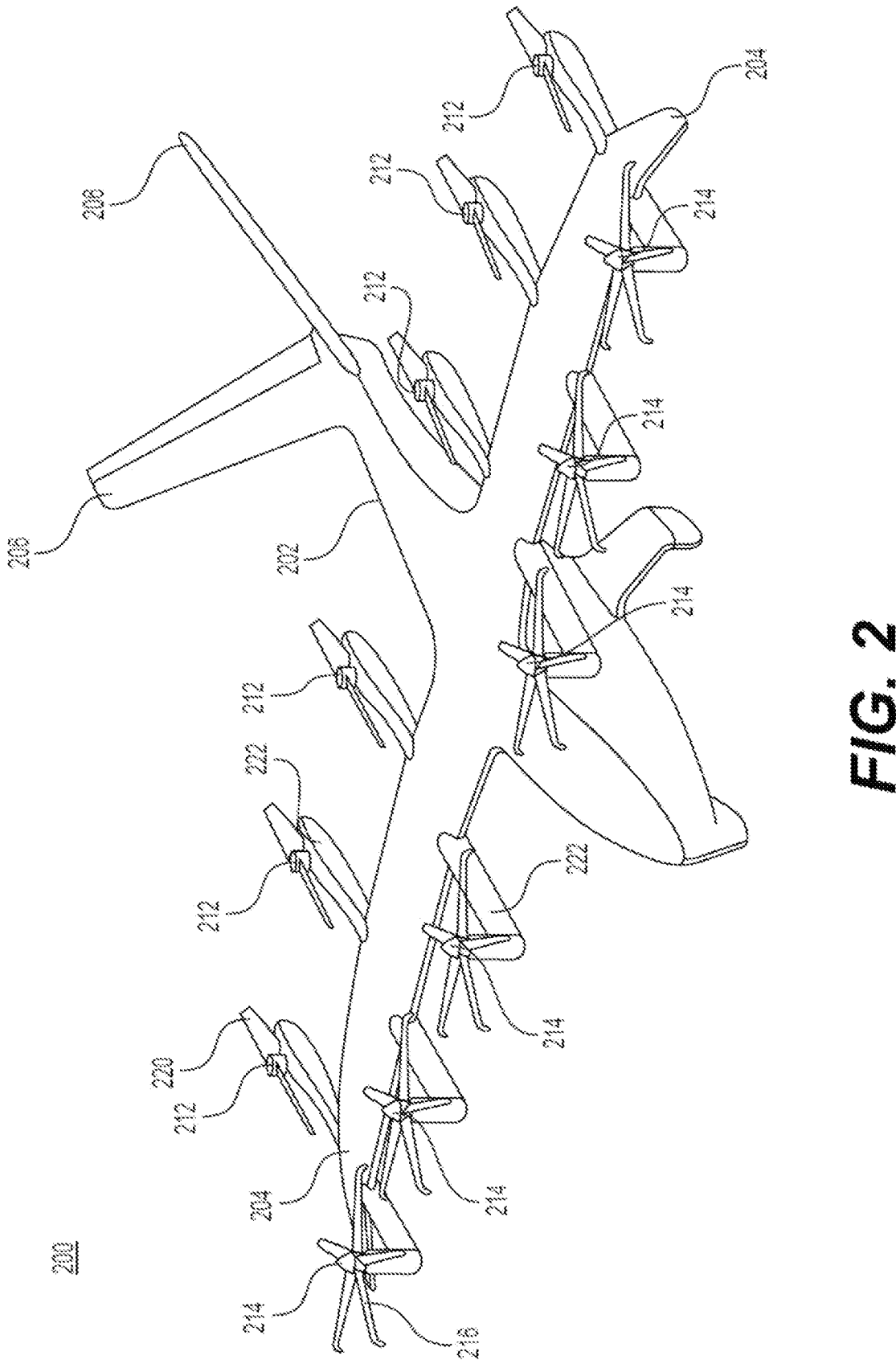
FIG. 2 shows an exemplary VTOL aircraft, consistent with disclosed embodiments.

FIG. 1 is an illustration of a perspective view of an exemplary VTOL aircraft, consistent with disclosed embodiments. FIG. 2 is another illustration of a perspective view of an exemplary VTOL aircraft in an alternative configuration, consistent with embodiments of the present disclosure. FIGS. 1 and 2 illustrate a VTOL aircraft 100, 200 in a cruise configuration and a vertical take-off, landing and hover configuration (also referred to herein as a "lift" configuration), respectively, consistent with embodiments of the present disclosure. Elements corresponding to FIGS. 1 and 2 may possess like numerals and refer to similar elements of the aircrafts 100, 200. The aircraft 100, 200 may include a fuselage 102, 202, wings 104, 204 mounted to the fuselage 102, 202 and one or more rear stabilizers 106, 206 mounted to the rear of the fuselage 102, 202. A plurality of lift propellers 112, 212 may be mounted to wings 104, 204 and may be configured to provide lift for vertical take-off, landing and hover. A plurality of tilt propellers 114, 214 may be mounted to wings 104, 204 and may be tiltable (e.g., configured to tilt or alter orientation) between the lift configuration in which they provide a portion of the lift required for vertical take-off, landing and hovering, as shown in FIG. 2, and the cruise configuration in which they provide forward thrust to aircraft 100 for horizontal flight, as shown in FIG. 1. As used herein, a tilt propeller lift configuration refers to any tilt propeller orientation in which the tilt propeller thrust is providing primarily lift to the aircraft and tilt propeller cruise configuration refers to any tilt propeller orientation in which the tilt propeller thrust is providing primarily forward thrust to the aircraft.

In some embodiments, lift propellers 112, 212 may be configured for providing lift only, with all horizontal propulsion being provided by the tilt propellers. For example, lift propellers 112, 212 may be configured with fixed positions and may only generate thrust during take-off, landing and hover phases of flight. Meanwhile, tilt propellers 114, 214 may be tilted upward into a lift configuration in which thrust from propellers 114, 214 is directed downward to provide additional lift.

For forward flight, tilt propellers 114, 214 may tilt from their lift configurations to their cruise configurations. In other words, the orientation of tilt propellers 114, 214 may be varied from an orientation in which the tilt propeller thrust is directed downward (to provide lift during vertical take-off, landing and hover) to an orientation in which the tilt propeller thrust is directed rearward (to provide forward thrust to aircraft 100, 200). The tilt propellers assembly for a particular electric engine may tilt about an axis of rotation defined by a mounting point connecting the boom and the electric engine. When the aircraft 100, 200 is in full forward flight, lift may be provided entirely by wings 104, 204. Meanwhile, in the cruise configuration, lift propellers 112, 212 may be shut off. The blades 120, 220 of lift propellers 112, 212 may be held in low-drag positions for aircraft cruising. In some embodiments, lift propellers 112, 212 may each have two blades 120, 220 that may be locked, for example while the aircraft is cruising, in minimum drag positions in which one blade is directly in front of the other blade as illustrated in FIG. 1. In some embodiments, lift propellers 112, 212 have more than two blades. In some embodiments, tilt propellers 114, 214 may include more blades 116, 216 than lift propellers 112, 212. For example, as illustrated in FIGS. 1 and 2, lift propellers 112, 212 may each include, e.g., two blades, whereas and tilt propellers 114, 214 may each include more blades, such as the five blades shown. In some embodiments, each of the tilt propellers 114, 214 may have 2 to 5 blades, and possibly more depending on the design considerations and requirements of the aircraft.

In some embodiments, the aircraft may include a single wing 104, 204 on each side of fuselage 102, 202 (or a single wing that extends across the entire aircraft). At least a portion of lift propellers 112, 212 may be located rearward of wings 104, 204 (e.g., rotation point of propeller is behind a wing from a bird's eye view) and at least a portion of tilt propellers 114, 214 may be located forward of wings 104, 204 (e.g., rotation point of propeller is in front of a wing from a bird's eye view). In some embodiments, all of lift propellers 112, 212 may be located rearward of wings 104, 204 and all of tilt propellers 114, 214 may be located forward of wings 104, 204. According to some embodiments, all lift propellers 112, 212 and tilt propellers 114, 214 may be mounted to the wings—e.g., no lift propellers or tilt propellers may be mounted to the fuselage. In some embodiments, lift propellers 112, 212 may be all located rearwardly of wings 104, 204 and tilt propellers 114, 214 may be all located forward of wings 104, 204. According to some embodiments, all lift propellers 112, 212 and tilt propellers 114, 214 may be positioned inwardly of the ends of the wing 104, 204.

In some embodiments, lift propellers 112, 212 and tilt propellers 114, 214 may be mounted to wings 104, 204 by booms 122, 222. Booms 122, 222 may be mounted beneath wings 104, 204, on top of the wings, and/or may be integrated into the wing profile. In some embodiments, lift propellers 112, 212 and tilt propellers 114, 214 may be mounted directly to wings 104, 204. In some embodiments, one lift propeller 112, 212 and one tilt propeller 114, 214 may be mounted to each boom 122, 222. Lift propeller 112, 212 may be mounted at a rear end of boom 122, 222 and tilt propeller 114, 214 may be mounted at a front end of boom 122, 222. In some embodiments, lift propeller 112, 212 may be mounted in a fixed position on boom 122, 222. In some embodiments, tilt propeller 114, 214 may mounted to a front end of boom 122, 222 via a hinge. Tilt propeller 114, 214 may be mounted to boom 122, 222 such that tilt propeller 114, 214 is aligned with the body of boom 122, 222 when in its cruise configuration, forming a continuous extension of the front end of boom 122, 222 that minimizes drag for forward flight.

In some embodiments, aircraft 100, 200 may include, e.g., one wing on each side of fuselage 102, 202 or a single wing that extends across the aircraft. According to some embodiments, the at least one wing 104, 204 is a high wing mounted to an upper side of fuselage 102, 202. According to some embodiments, the wings include control surfaces, such as flaps and/or ailerons. According to some embodiments, wings 104, 204 may have a profile that reduces drag during forward flight. In some embodiments, the wing tip profile may be curved and/or tapered to minimize drag.

In some embodiments, rear stabilizers 106, 206 include control surfaces, such as one or more rudders, one or more elevators, and/or one or more combined rudder-elevators. The wing(s) may have any suitable design for providing lift, directionality, stability, and/or any other characteristic beneficial for aircraft. In some embodiments, the wings have a tapering leading edge.

In some embodiments, lift propellers 112, 212 or tilt propellers 114, 214 may be canted relative to at least one other lift propeller 112, 212 or tilt propeller 114, 214, where canting refers to a relative orientation of the rotational axis of the lift propeller/tilt propeller about a line that is parallel to the forward-rearward direction, analogous to the roll degree of freedom of the aircraft.

In some embodiments, one or more lift propellers 112, 212 and/or tilt propellers 114, 214 may canted relative to a cabin of the aircraft, such that the rotational axis of the propeller in a lift configuration is angled away from an axis perpendicular to the top surface of the aircraft. For example, in some embodiments, the aircraft is a flying wing aircraft as shown in FIG. 9E below, and some or all of the propellers are canted away from the cabin.

Figure 3:
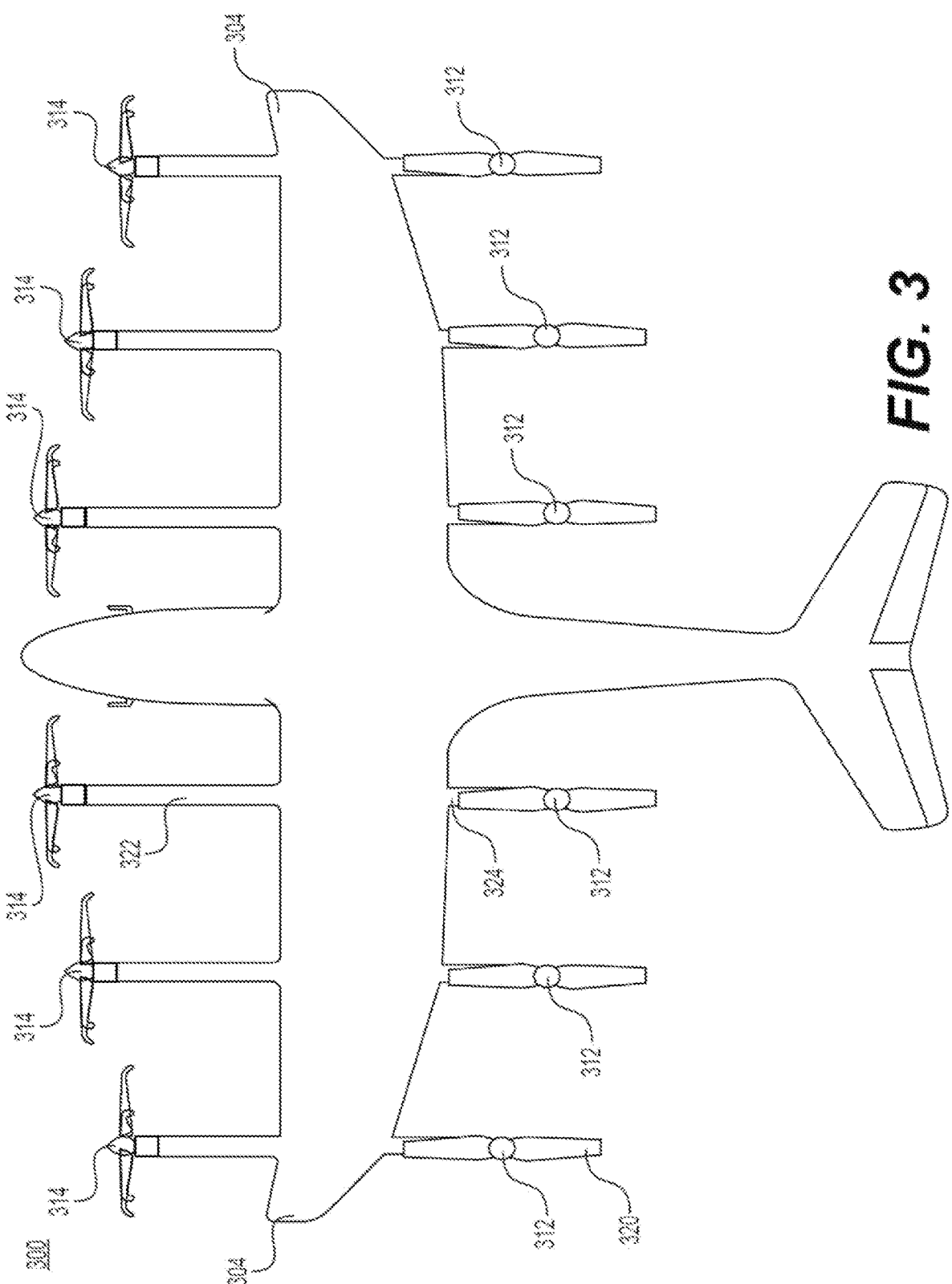
FIG. 3 shows an exemplary top plane view of a VTOL aircraft, consistent with disclosed embodiments.

FIG. 3 is an illustration of a top plane view of an exemplary VTOL aircraft, consistent with embodiments of the present disclosure. Aircraft 300 shown in the figure may be a top plan view of the aircraft 100, 200 shown in FIGS. 1 and 2, respectively. As discussed herein, an aircraft 300 may include twelve electric propulsion systems distributed across the aircraft 300. In some embodiments, a distribution of electric propulsion systems may include six forward electric propulsion systems 314 and six aft electric propulsion systems 312 mounted on booms forward and aft of the main wings 304 of the aircraft 300. In some embodiments, forward electric propulsion systems may be mounted to wings 304 by booms 322, as depicted in FIG. 3. In some embodiments, aft electric propulsion systems may be mounted to wings 304 by booms 324. In some embodiments, a length of the rear end of the boom 324 from the wing 304 to a lift propeller (part of electric propulsion system 312) may comprise a similar rear end of the boom 324 length across the numerous rear ends of the booms. In some embodiments, the length of the rear ends of the booms may vary, for example, across the six rear ends of the booms. Further, FIG. 3 depicts an exemplary embodiment of a VTOL aircraft 300 with forward propellers (part of electric propulsion system 314) in a horizontal orientation for horizontal flight and aft propeller blades 320 in a stowed position for a forward phase of flight.

Figure 4:
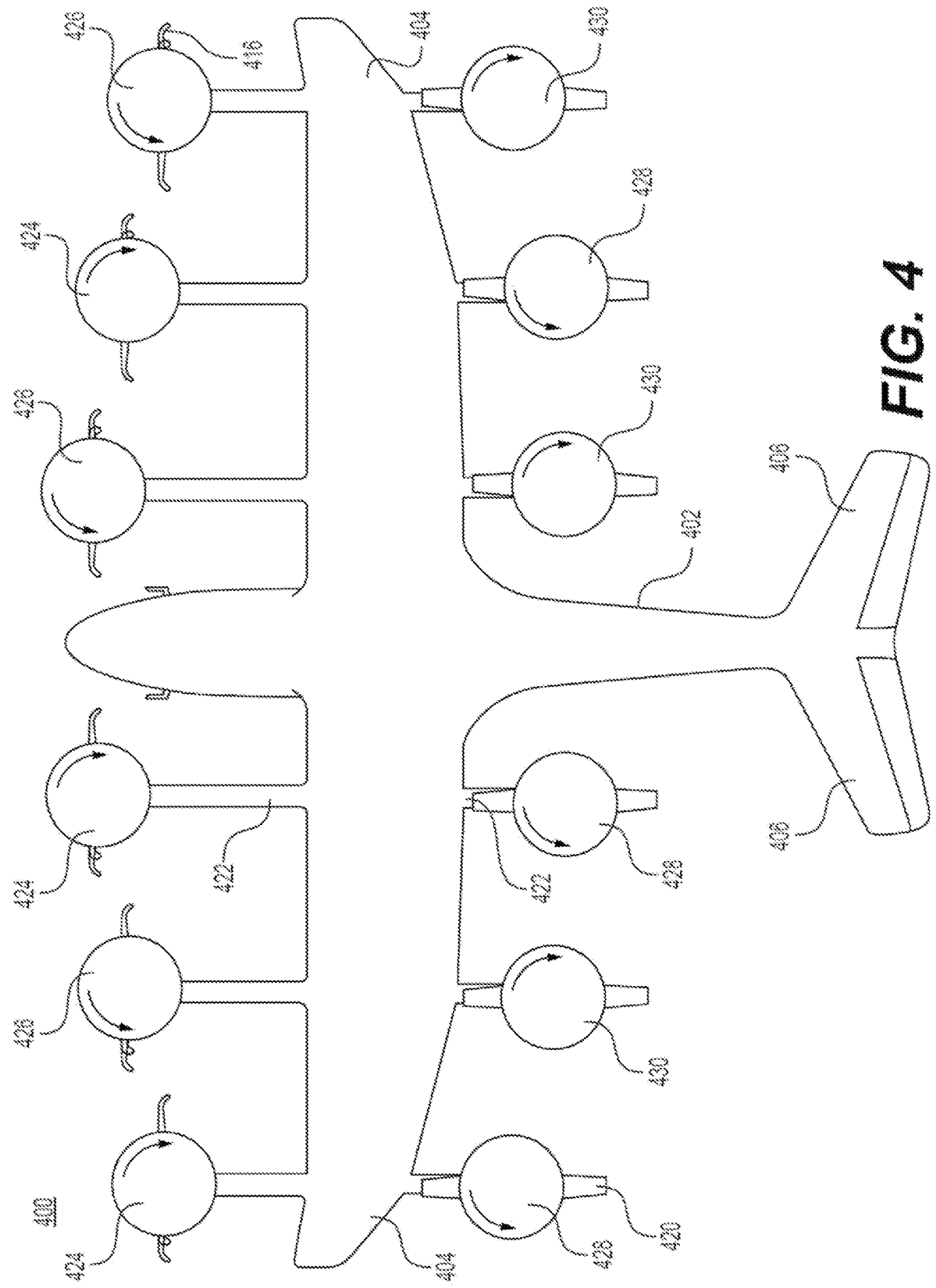
FIG. 4 illustrates exemplary propeller rotation of a VTOL aircraft, consistent with disclosed embodiments.

FIG. 4 is a schematic diagram illustrating exemplary propeller rotation of a VTOL aircraft, consistent with disclosed embodiments. Aircraft 400 shown in the figure may be a top plan view of the aircraft 100, 200, and 300 shown in FIGS. 1, 2, and 3, respectively. An aircraft 400 may include six forward electric propulsion systems with three of the forward electric propulsion systems being of CW type 424 and the remaining three forward electric propulsion systems being of CCW type 426. In some embodiments, three aft electric propulsion systems may be of CCW type 428 with the remaining three aft electric propulsion systems being of CW type 430. Some embodiments may include an aircraft 400 possessing four forward electric propulsion systems and four aft electric propulsion systems, each with two CW types and two CCW types. In some embodiments, aircraft 400 may include a fuselage 402, wing(s) 404 mounted to the fuselage 402, and one or more rear stabilizers 406 mounted to the rear of the fuselage 402. In some embodiments, each forward electric propulsion system may include propeller blades 416. In some embodiments, each aft electric propulsion system may include propeller blades 420. In some embodiments, electric propulsion systems may be mounted to wing(s) 404 by booms 422. In some embodiments, propellers may counter-rotate with respect to adjacent propellers to cancel torque steer, generated by the rotation of the propellers, experienced by the fuselage or wings of the aircraft. In some embodiments, the difference in rotation direction may be achieved using the direction of engine rotation. In other embodiments, the engines may all rotate in the same direction, and gearing may be used to achieve different propeller rotation directions.

Some embodiments may include an aircraft 400 possessing forward and aft electric propulsion systems where the amount of CW types 424 and CCW types 426 is not equal among the forward electric propulsion systems, among the aft electric propulsion systems, or among the forward and aft electric propulsion systems.

Figure 5:
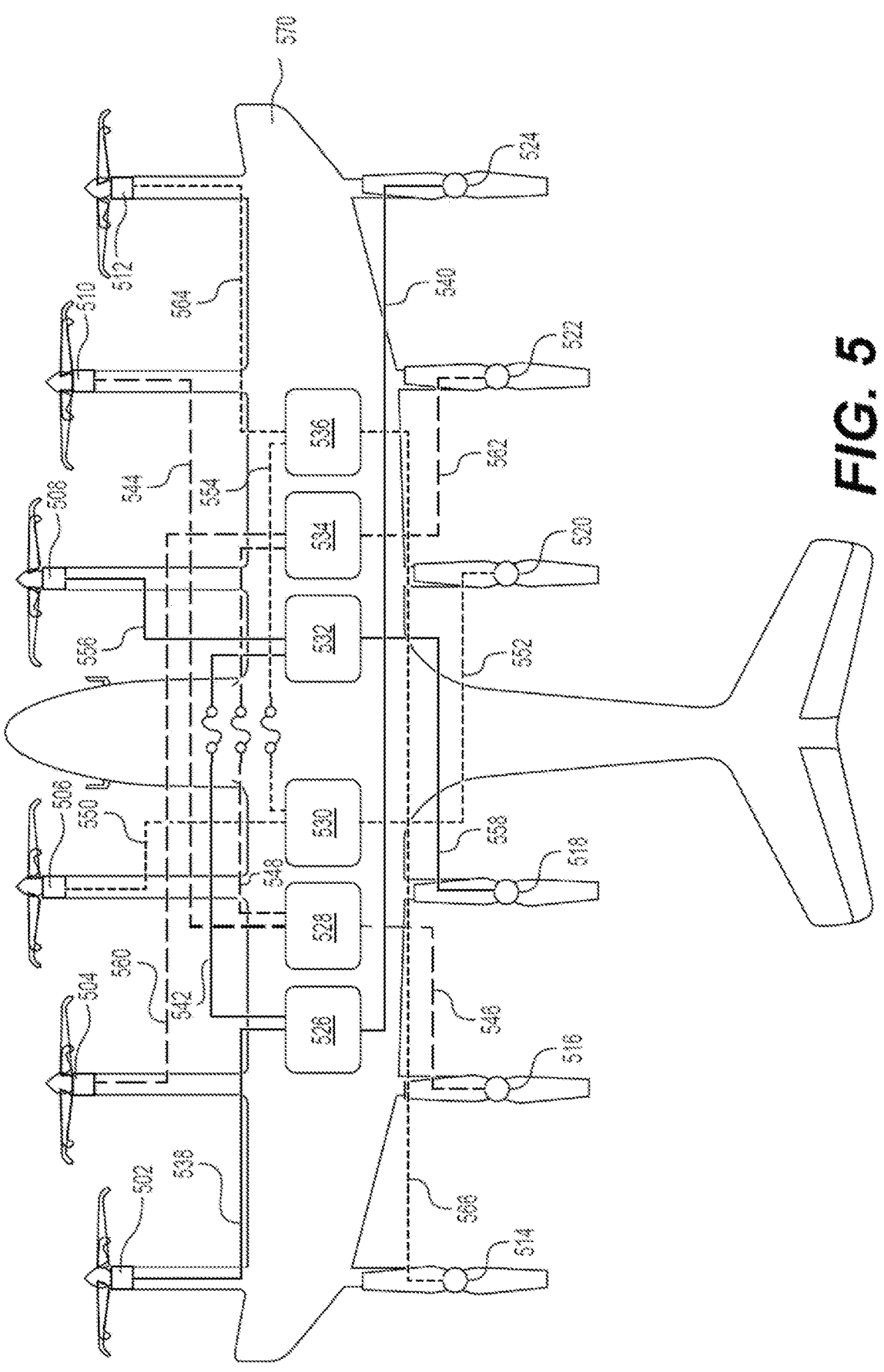
FIG. 5 shows exemplary power connections in a VTOL aircraft, consistent with disclosed embodiments.

FIG. 5 is a schematic diagram illustrating exemplary power connections in a VTOL aircraft, consistent with disclosed embodiments. A VTOL aircraft may have multiple power systems connected to diagonally opposing electric propulsion systems. In some embodiments, the power systems may include high voltage power systems. Some embodiments may include high voltage power systems connected to electric engines via high voltage channels 538, 540, 544, 546, 550, 552, 556, 558, 560, 562, 564, and 566. In some embodiments, an aircraft 500 may include six power systems (e.g., battery packs), including power systems 526, 528, 530, 532, 534, and 536 stored within the wing 570 of the aircraft 500. In some embodiments, an aircraft 500 may include at least one cross-link 542, 548, and 554 (e.g., high voltage bus) possessing a fuse allowing for pairing of two or more power systems 526, 528, 530, 532, 534, and 536. The power systems may power electric propulsion systems and/or other electric components of the aircraft 500. In some embodiments, the aircraft 500 may include six forward electric propulsion systems having six electric engines 502, 504, 506, 508, 510, and 512 and six aft electric propulsion systems having six electric engines 514, 516, 518, 520, 522, and 524. In some embodiments, one or more power systems (e.g., battery packs) may include a battery management system ("BMS") (e.g., one BMS for each battery pack). While six power systems are shown in FIG. 5, the aircraft 500 may include any number and/or configuration of power systems.

Figure 6:
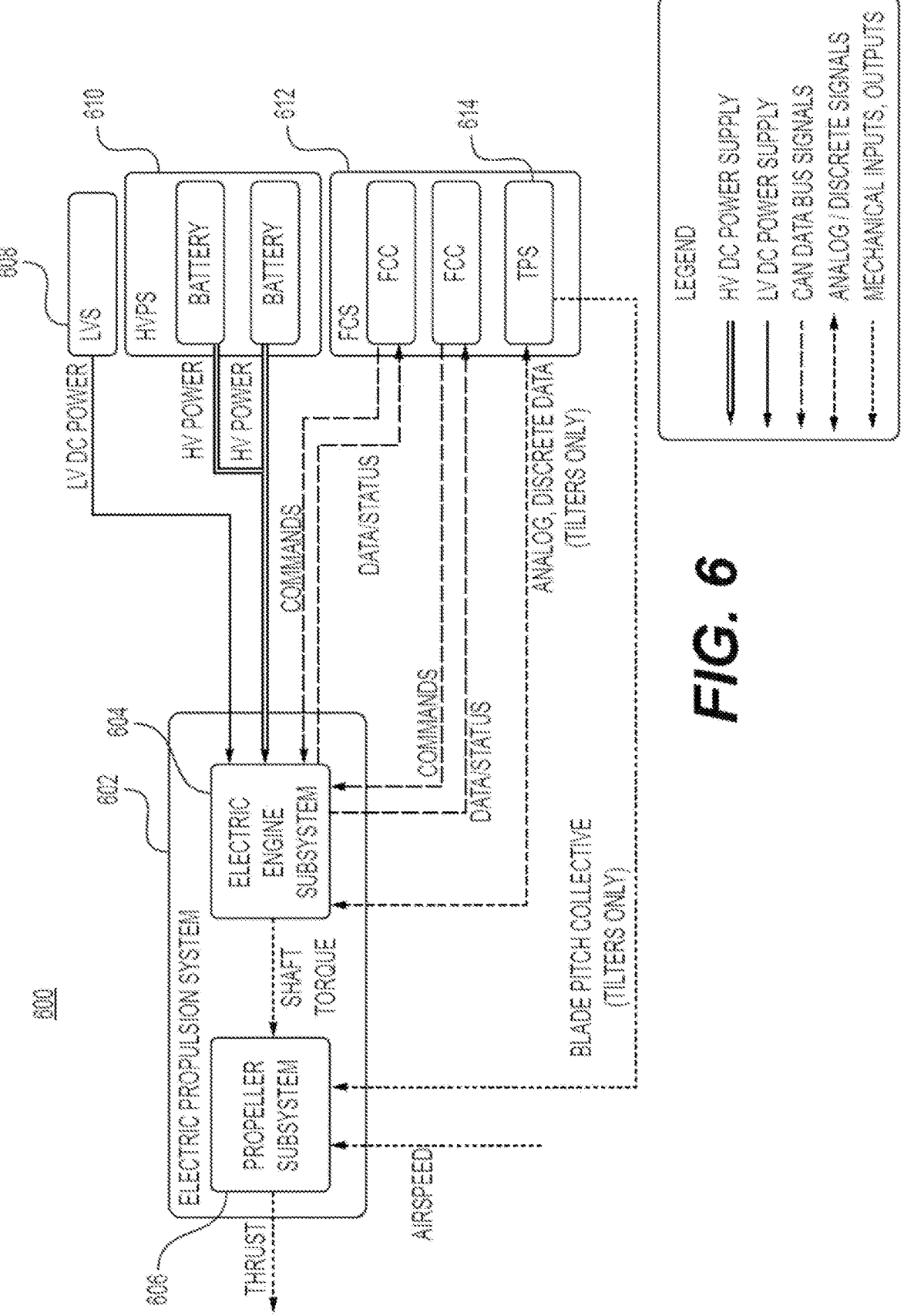
FIG. 6 shows an exemplary architecture of an electric propulsion unit, consistent with disclosed embodiments.

In some embodiments, the one or more battery management systems may communicate with a Flight Control System ("FCS") of the aircraft (e.g., FCS 612 shown in FIG. 6). For example, the FCS may monitor the status of one or more battery packs and/or provide commands to the one or more battery management systems which make corresponding adjustments to the high voltage power supply.

FIG. 6 illustrates block diagram of an exemplary architecture and design of an electric propulsion unit 600 consistent with disclosed embodiments. Exemplary electric propulsion unit 600 includes an electric propulsion system 602, which may be configured to control aircraft propellers. Electric propulsion system 602 may include an electric engine subsystem 604 that may supply torque, via a shaft, to a propeller subsystem 606 to produce the thrust of the electric propulsion system 602. Some embodiments may include the electric engine subsystem 604 receiving low voltage direct current (LV DC) power from a Low Voltage System (LVS) 608. In some embodiments, the electric engine subsystem 604 may be configured to receive high voltage (HV) power from a High Voltage Power System (HVPS) 610 comprising at least one battery or other device capable of storing energy. HV power may refer to power that is lower in voltage than voltage provided by Low Voltage System (LVS) 608.

Some embodiments may include an electric propulsion system 602 including an electric engine subsystem 604 receiving signals from and sending signals to a flight control system 612. In some embodiments, a flight control system (FCS) 612 may comprise a flight control computer capable of using Controller Area Network ("CAN") data bus signals to send commands to the electric engine subsystem 604 and receive status and data from the electric engine subsystem 604. It should be understood that while CAN data bus signals are used between the flight control computer and the electric engine(s), some embodiments may include any form of communication with the ability to send and receive data from a flight control computer to an electric engine. Some embodiments may include electric engine subsystems 604 capable of receiving operating parameters from and communicating operating parameters to an FCC in FCS 612, including speed, voltage, current, torque, temperature, vibration, propeller position, and/or any other value of operating parameters.

In some embodiments, a flight control system 612 may also include a Tilt Propeller System ("TPS") 614 capable of sending and receiving analog, discrete data to and from the electric engine subsystem 604 of the tilt propellers. A tilt propeller system 614 may include an apparatus capable of communicating operating parameters to an electric engine subsystem 604 and articulating an orientation of the propeller subsystem 606 to redirect the thrust of the tilt propellers during various phases of flight using mechanical means such as a gearbox assembly, linear actuators, and any other configuration of components to alter an orientation of the propeller subsystem 606. In some embodiments, electric engine subsystem may communicate an orientation of the propeller system (e.g., an angle between lift and forward thrust) to TPS 614 and/or FCS 612 (e.g., during flight).

Figure 7:
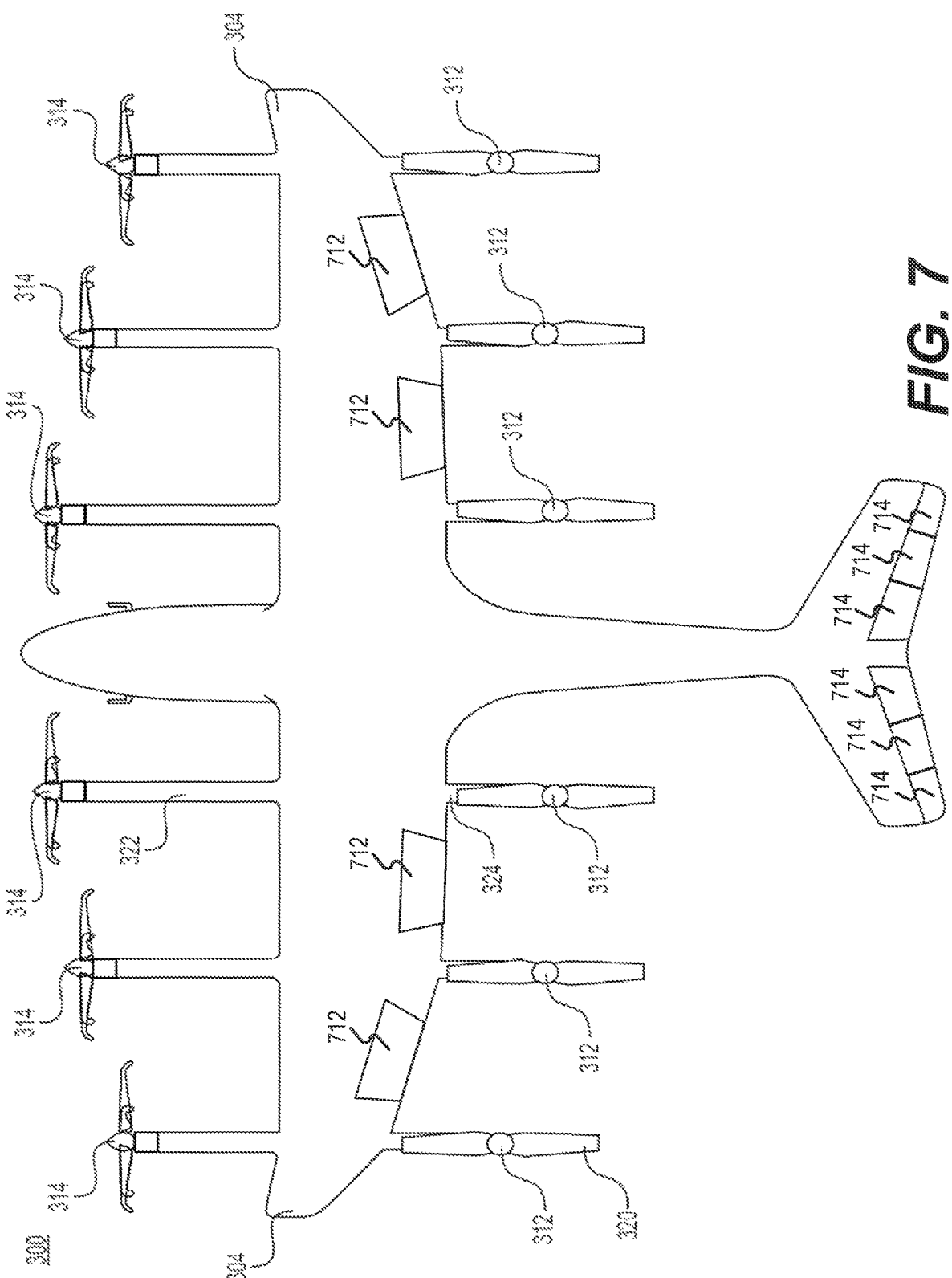
FIG. 7 shows an exemplary top plane view of a VTOL aircraft, consistent with disclosed embodiments.

In some embodiments, a flight control system may include a system capable of controlling control surfaces and their associated actuators in an exemplary VTOL aircraft. FIG. 7 is an illustration of a top plane view of an exemplary VTOL aircraft, consistent with embodiments of the present disclosure. Aircraft 700 shown in the figure may be a top plan view of the aircraft 100, 200 shown in FIGS. 1 and 2, respectively. In aircraft 700, the control surfaces may include, in addition to the propeller blades discussed earlier, flaperons 712 and ruddervators 714. Flaperons 712 may combine functions of one or more flaps, one or more ailerons, and/or one or more spoilers. Ruddervators 714 may combine functions or one or more rudders and/or one or more elevators. Additionally or alternatively, control surfaces may include separate rudders and elevators. In aircraft

700, the actuators may include, in addition to the electric propulsion systems discussed earlier, control surface actuators (CSAs) associated with flaperons 712 and ruddervators 714, as discussed further below with reference to FIG. 8.

Figure 8:
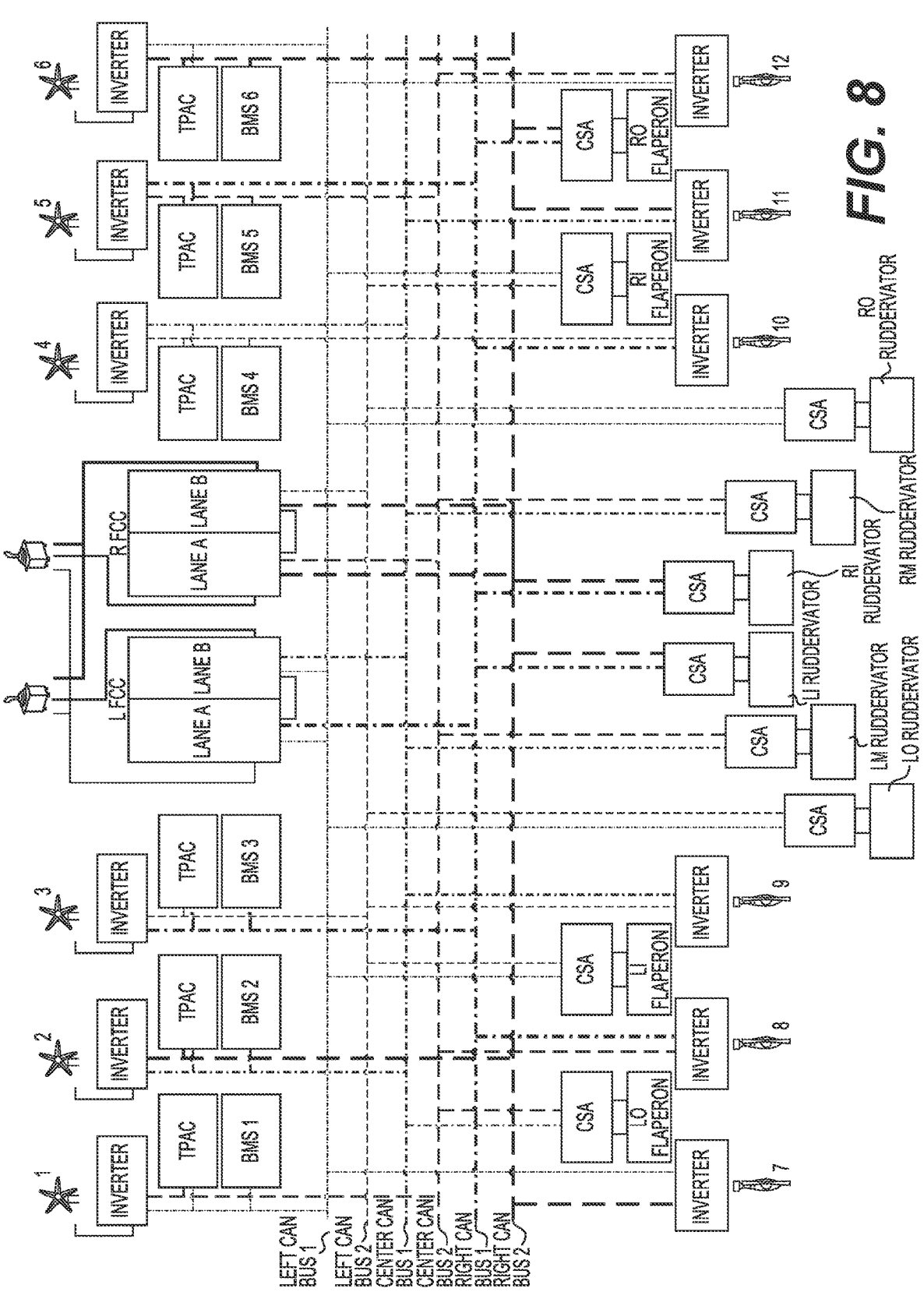
FIG. 8 shows an exemplary flight control signaling architecture, consistent with disclosed embodiments.

FIG. 8 illustrates a flight control signaling architecture for controlling the control surfaces and associated actuators, according to various embodiments. Although FIG. 7 illustrates twelve EPU inverters and associated propeller blades, six tilt propeller actuators (TPACs), six battery management systems (BMSs), four flaperons and associated control surface actuators (CSAs), and six ruddervators and associated CSAs, aircraft according to various embodiments can have any suitable number of these various elements. As shown in FIG. 8, control surfaces and actuators may be controlled by a combination of four flight control computers (FCCs)—Left FCC, Lane A (L FCC-A), Left FCC, Lane B (L FCC-B), Right FCC, Lane A (R FCC-A), and Right FCC, Lane A (R FCC-B), although any other suitable number of FCCs may be utilized. The FCCs may each individually control all control surfaces and actuators or may do so in any combination with each other. In some embodiments, each FCC may include one or more hardware computing processors. In some embodiments, each FCC may utilize a single-threaded computing process or a multi-threaded computing process to perform the computations required to control the control surfaces and actuators. In some embodiments, all computing process required to control the control surfaces and actuators may be performed on a single computing thread by a single flight control computer.

The FCCs may provide control signals to the control surface actuators, including the EPU inverters, TPACs, BMSs, flaperon CSAs, and ruddervator CSAs, via one or more bus systems. For different control surface actuators, the FCC may provide control signals, such as voltage or current control signals, and control information may be encoded in the control signals in binary, digital, or analog form. In some embodiments, the bus systems may each be a CAN bus system, e.g., Left CAN bus 1, Left CAN bus 2, Right CAN bus 1, Right CAN bus 2, Center CAN bus 1, Center CAN bus 2 (see FIG. 8). In some embodiments, multiple FCCs may be configured to provide control signals via each CAN bus system, and each FCC may be configured to provide control signals via multiple CAN bus systems. In the exemplary architecture illustrated in FIG. 8, for example, L FCC-A may provide control signals via Left CAN bus 1 and Right CAN bus 1, L FCC-B may provide control signals via Left CAN bus 1 and Center CAN bus 1, R FCC-A may provide control signals via Center CAN bus 2 and Right CAN bus 2, and R FCC-B may provide control signals via Left CAN bus 2 and Right CAN bus.

FIGS. 9A-9E are illustrations of a top plane view of exemplary VTOL aircrafts, consistent with embodiments of the present disclosure. There may be a number of design considerations (cost, weight, size, performance capability etc.) that may influence the number and/or combination of tilt and lift propellers in an VTOL aircraft.

FIG. 9A illustrates an arrangement of electric propulsion units, consistent with embodiments of the present disclosure. Referring to FIG. 9A, the aircraft shown in the figure may be a top plan view of an exemplary aircraft (e.g., a VTOL aircraft). The aircraft may include twelve electric propulsion systems distributed across the aircraft. In some embodiments, a distribution of electric propulsion systems may include six forward electric propulsion systems (901, 902, 903, 904, 905, and 906) and six aft electric propulsion systems (907, 908, 909, 910, 911, and 912). In some embodiments, the six forward electric propulsion systems may be operatively connected to tilt propellers and the six aft electric propulsion systems may be operatively connected to lift propellers. In other embodiments, the six forward electric propulsion systems and a number of aft electric propulsion systems may be operatively connected to tilt propellers and the remaining aft electric propulsion systems may be operatively connected to lift propellers. In other embodiments, all forward and aft electric propulsion systems may be operatively coupled to tilt propellers.

FIG. 9B illustrates an alternate arrangement of electric propulsion units, consistent with embodiments of the present disclosure. Referring to FIG. 9B, the aircraft shown in the figure may be a top plan view of an exemplary aircraft (e.g., a VTOL aircraft). The aircraft may include eight electric propulsion systems distributed across the aircraft. In some embodiments, a distribution of electric propulsion systems may include four forward electric propulsion systems (913, 914, 915, and 916) and four aft electric propulsion systems (917, 918, 919, and 920). In some embodiments, the four forward electric propulsion systems may be operatively connected to tilt propellers and the four aft electric propulsion systems may be operatively connected to lift propellers. In other embodiments, the four forward electric propulsion systems and a number of aft electric propulsion systems may be operatively connected to tilt propellers and the remaining aft electric propulsion systems may be operatively connected to lift propellers. In other embodiments, all forward and aft electric propulsion systems may be operatively coupled to tilt propellers.

FIG. 9C illustrates an alternate arrangement of electric propulsion units, consistent with embodiments of the present disclosure. Referring to FIG. 9C, the aircraft shown in the figure may be a top plan view of an exemplary aircraft (e.g., a VTOL aircraft). The aircraft may include six electric propulsion systems distributed across the aircraft. In some embodiments, a distribution of electric propulsion systems may include a first set of four electric propulsion systems 921, 922, 923, and 924 coplanar in a first plane and a second set of two electric propulsion systems 925 and 926 coplanar in a second plane. In some embodiments, the first set of electric propulsion systems 921-924 may be operatively connected to tilt propellers and second set of electric propulsion systems 925 and 926 may be operatively connected to lift propellers. In other embodiments, the first set of electric propulsion systems 921-924 and the second set of aft electric propulsion systems 925 and 926 may all be operatively connected to tilt propellers.

FIG. 9D illustrates an alternate arrangement of electric propulsion units, consistent with embodiments of the present disclosure. Referring to FIG. 9D, the aircraft shown in the figure may be a top plan view of an exemplary aircraft (e.g., a VTOL aircraft). The aircraft may include four electric propulsion systems distributed across the aircraft. In some embodiments, a distribution of electric propulsion systems may include four coplanar electric propulsion systems 927, 928, 929, and 930. In some embodiments, all of the electric propulsion systems may be operatively connected to tilt propellers.

FIG. 9E illustrates an alternate arrangement of electric propulsion units, consistent with embodiments of the present disclosure. Referring to FIG. 9E, the aircraft shown in the figure may be a top plan view of an exemplary aircraft (e.g., a VTOL aircraft). The aircraft may include six electric propulsion systems distributed across the aircraft. For example, in some embodiments, the aircraft may include four forward electric propulsion systems 931, 932, 933, and 934 operatively connected to tilt propellers and the two aft electric propulsion systems 935 and 936 operatively connected to lift propellers. In some embodiments, the aircraft may include ten electric propulsion systems distributed across the aircraft. For example, in some embodiments, the aircraft may include six forward electric propulsion systems operatively connected to tilt propellers and the four aft electric propulsion systems operatively connected to lift propellers. In some embodiments, some or all of the aft electric propulsion systems may operatively connected to tilt propellers.

As shown in FIG. 9E, in some embodiments, the aircraft may have a flying wing configuration, such as a tailless fixed-wing aircraft with no definite fuselage. In some embodiments, the aircraft may have a flying wing configuration with the fuselage integrated into the wing. In some embodiments, the tilt propellers may rotate in a plane above the body of the aircraft when the tilt propellers operate in a lift configuration.

As disclosed herein, the forward electric propulsion systems and aft electric propulsion systems may be of a clockwise (CW) type or counterclockwise (CCW) type. Some embodiments may include various forward electric propulsion systems possessing a mixture of both CW and CCW types. In some embodiments, the aft electric propulsion systems may possess a mixture of CW and CCW type systems among the aft electric propulsion systems. In some embodiments, each electric propulsion systems may be fixed as clockwise (CW) type or counterclockwise (CCW) type, while in other embodiments, one or more electric propulsion systems may vary between clockwise (CW) and counterclockwise (CCW) rotation.

With reference to FIGS. 10-16E, most airborne vehicles with hover and transition capabilities pose a challenge in maintaining stability due to the natural instability of maintaining balance in the face of external forces. In order to counteract such forces, some conventional vehicles, such as helicopters, may be configured to utilize control mechanisms such as cyclic or collective pitch control to maintain stability and control direction. However, some airborne vehicles may require maintaining stability in a different manner from conventional vehicles due to structural differences. For example, while traditional helicopters usually have a fixed rotor RPM (revolutions-per-minute) during normal operations, some aircrafts may comprise varying RPM systems. Furthermore, some aircrafts may be configured such that a tilt mechanism is linked with a pitch of each propeller in order to reduce structural weight by eliminating the need for additional components for individual propeller blade pitch control. In order to compensate for the lack of individual propeller blade pitch control, such aircrafts may require additional mechanisms for maintaining stability in the face of external forces.

Figure 10:
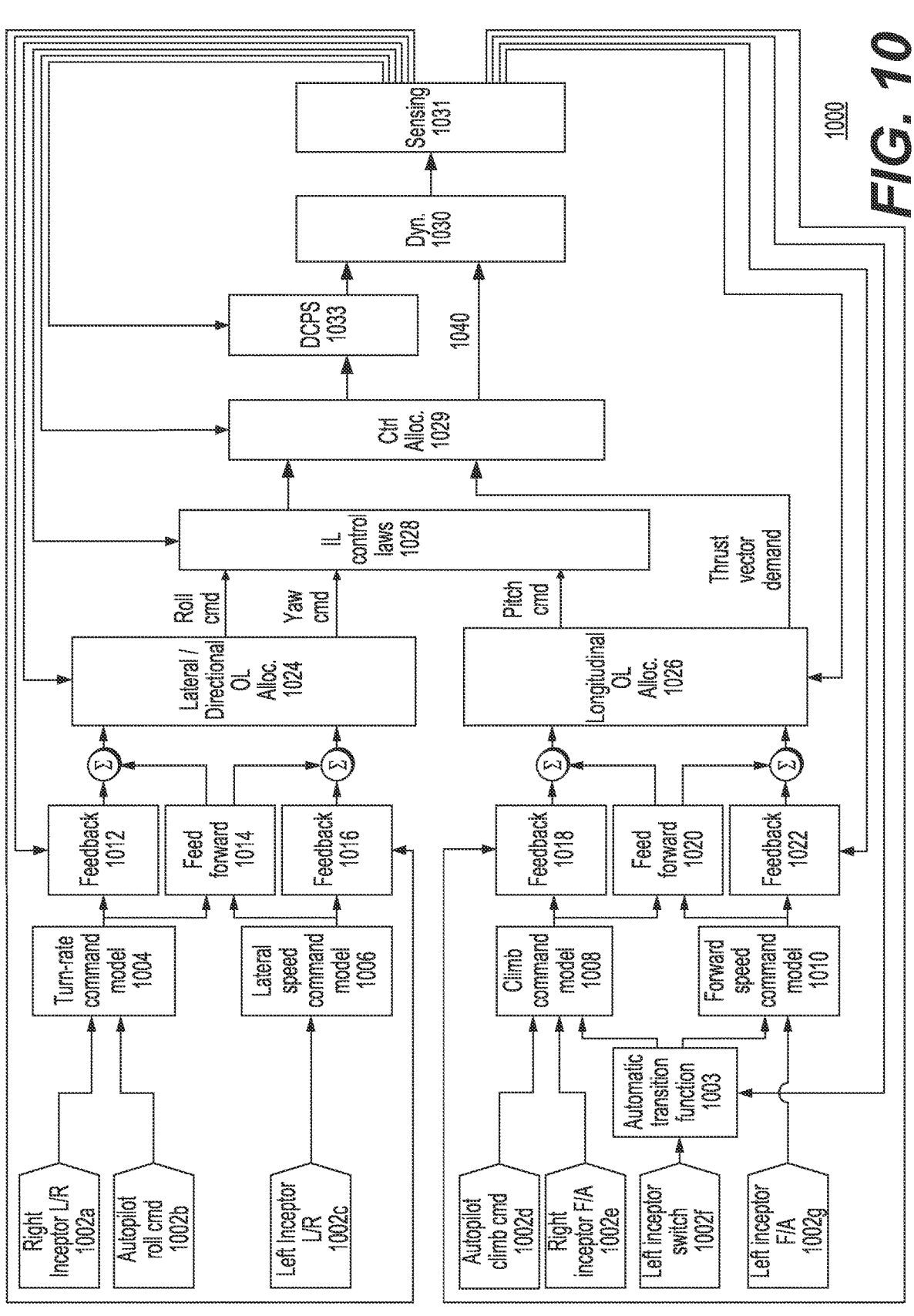
FIG. 10 illustrates a functional block diagram of an exemplary control system of an electric VTOL aircraft, consistent with disclosed embodiments.

FIG. 10 illustrates a functional block diagram of an exemplary control system 1000 of an aircraft, consistent with disclosed embodiments. System 1000 may be implemented by at least one processor (e.g., at least one a microprocessor-based controller) configured to execute software code stored in a storage medium (e.g., a computer-readable medium, a non-transitory computer-readable medium) to implement the functions described herein. System 1000 may also be implemented in hardware, or a combination of hardware and software. System 1000 may be implemented as part of a flight control system of the aircraft (e.g., part of FCS 612 in FIG. 6) and may be configured to perform a single step or sequence repeatedly until a desired or commanded outcome is achieved. It is to be understood that many conventional functions of the control system are not shown in FIG. 10 for ease of description. System 1000 further includes one or more storage mediums storing model(s), function(s), table(s), and/or any information for executing the disclosed processes. As further described below, any or each box indicating a command model (e.g., 1004, 1006, 1008, and 1010), feedback (1012, 1016, 1018, and 1022), feed forward (1014, 1020), outer loop allocation (1024, 1026), inner loop control laws 1028, control allocation 1029, and DCPS 1033 may represent or include module(s), script(s), function(s), application(s), and/or program(s) that are executed by processor(s) and/or microprocessor(s) of the System 1000. It is appreciated that the complexity and interconnectedness of the functional block diagram of FIG. 10 would be impossible, or at least impractical, to effectively implement by a human user, especially when considering that these functionalities are implemented while the aircraft is flying (including taking off or landing).

System 1000 may detect one or more inputs, such as from a pilot input device configured to receive at least one pilot input and generate or influence a signal. A pilot input may be generated by and/or received from an input device or mechanism of the aircraft, such as a button, a switch, a stick, a slider, an inceptor, or any other device configured to generate or influence a signal based on a physical action from a pilot. For example, a pilot input device may include one or more of right inceptor(s) (e.g., moving left/right 1002*a* and/or forward/aft 1002*e*), left inceptor(s) (e.g., moving left/right 1002*c* and/or forward/aft 1002*g*), and/or left inceptor switch 1002*f*. In some embodiments, a pilot input device may include an interface with an autopilot system (e.g., display screen(s), switch(es), button(s), lever(s), and/or other interface(s)). Optionally, system 1000 may further detect inputs from an autopilot system, such as autopilot roll command 1002*b*, autopilot climb command 1002*d*, and/or other command(s) to control the aircraft.

In some embodiments, the one or more inputs may include at least one of a position and/or rate of a right inceptor and/or a left inceptor, signals received (e.g., response type change commands, trim inputs, backup control inputs, etc.) from switches on the inceptors, measurements of aircraft state and environmental conditions (e.g., measured load factor, airspeed, roll angle, pitch angle, actuator states, battery states, aerodynamic parameters, temperature, gusts, etc.) based on data received from one or more sensors of the aircraft, obstacles (e.g., presence or absence of other aircraft and/or debris), and an aircraft mode (e.g., taxiing on the ground, takeoff, in-air). For example, right inceptor L/R 1002*a* may comprise a lateral position and/or rate of a right inceptor (e.g., an inceptor positioned to the right of another inceptor and/or an inceptor positioned on the right side of a pilot area), autopilot roll cmd 1002*b* may comprise a roll signal received in autopilot mode, left inceptor L/R 1002*c* may comprise a lateral position and/or rate of a left inceptor (e.g., an inceptor positioned to the left of another inceptor and/or an inceptor positioned on the left side of a pilot area), autopilot climb cmd 1002*d* may comprise a climb signal received in autopilot mode, right inceptor F/A 1002*e* may comprise a longitudinal position and/or rate of the right inceptor, left inceptor switch 1002*f* may comprise a signal from a switch for enabling or disabling automatic transition function 1003, and left inceptor F/A 1002*g* may comprise a longitudinal position and/or rate of the left inceptor.

Each input may include additional data as listed above (e.g., signals from switches, measurements of aircraft state, aircraft mode, etc.). Actuator states may include actuator hardware limits, such as travel limits, speed limits, response time limits, etc., and can include actuator health indicators that may indicate deteriorations in actuator performance that may limit a given actuator's ability to satisfy actuator commands. Actuator states may be used to determine the bounds (e.g., minimum/maximum values) for individual actuator commands. Battery states may correspond to remaining energy of the battery packs of the aircraft, which may be monitored when control allocation 1029 considers balancing battery pack energy states. Aerodynamic parameters may be parameters derived from aerodynamic and acoustic modeling and can be based on the actuator Jacobian matrices and actuator states. Each input received from an inceptor may indicate a corresponding adjustment to an aircraft's heading or power output.

Command models 1004, 1006, 1008 and 1010 may be configured to determine a shape (e.g., aggressiveness, slew rate, damping, overshoot, etc.) of an ideal aircraft response. For example, each command model of command models 1004, 1006, 1008 and 1010 may be configured to receive and interpret at least one of inputs 1002*a*, 1002*b*, 1002*c*, 1002*d*, 1002*e*, 1002*f* and 1002*g* and, in response, compute a corresponding change to an aircraft's orientation, heading, and propulsion, or a combination thereof using an integrator (not pictured). In some embodiments, right inceptor L/R 1002*a* and autopilot roll cmd 1002*b* may be fed into turn-rate command model 1004, left inceptor L/R 1002*c* may be fed into lateral speed command model 1006, autopilot climb cmd 1002*d* and right inceptor F/A 1002*e* may be fed into climb command model 1008, and left inceptor F/A 1002*g* may be fed into forward speed command model 1010. In some embodiments, an output from automatic transition function 1003 may be fed into at least one of climb command model 1008 or forward speed command model 1010. For example, based on receiving an enable signal from left inceptor switch 1002*f*, automatic transition function 1003 may automatically determine at least one of a climb signal or a forward speed signal for transmission to at least one of climb command model 1008 or forward speed command model 1010.

Turn-rate command model 1004 may be configured to output a desired position and/or turn-rate command and may also be configured to compute a desired heading of the aircraft to be assumed when the inceptor is brought back to a centered position (e.g., in detent). Lateral speed command model 1006 may be configured to output a desired position and/or lateral speed command. Climb command model 1008 may be configured to output at least one of a desired altitude, vertical speed, or vertical acceleration command. Forward speed command model 1010 may be configured to output at least one of a desired position, longitudinal speed, or longitudinal acceleration command. In some embodiments, one or more of the command models may be configured to output an acceleration generated in response to changes in speed command. For example, climb command model 1008 may be configured to output a vertical acceleration generated in response to a change in vertical speed command.

Feed forward 1014 and 1020 may each receive as input one or more desired changes (e.g., desired position, speed and/or acceleration) from corresponding command models 1004, 1006, 1008 or 1010 as well as data received from the one or more aircraft sensors (e.g., airspeed, vehicle orientation, vehicle load factor, measured acceleration, vehicle mass and inertia, air density, altitude, aircraft mode, etc.) and may be configured to output, for each desired change, a corresponding force to accomplish the desired change. In some embodiments, feed forward 1014 and 1020 may be configured to determine the corresponding force using simplified models of aircraft dynamics. For example, based on a known (e.g., a stored value of) or determined mass of the aircraft, feed forward 1014 and 1020 may be configured to determine a force to cause the aircraft to follow a desired acceleration command. In some embodiments, feed forward 1014 and 1020 may be configured to use a model predicting an amount of drag on the vehicle produced as a function of speed in order to determine a force required to follow a desired speed command signal.

Feedback 1012, 1016, 1018, and 1022 may each receive as input the one or more desired changes (e.g., desired position, speed and/or acceleration) from command models 1004, 1006, 1008 and 1010 as well as data received from vehicle sensing 1031 indicative of vehicle dynamics 1030. For example, sensed vehicle dynamics 1030 may comprise the physics and/or natural dynamics of the aircraft, and Vehicle Dynamics Sensing 1031 sensor measurements may capture how the aircraft moves in response to pilot inputs, propulsion system outputs or ambient conditions. Additionally or alternatively, data received from vehicle sensing 1031 may include error signals generated, by one or more processors, based on exogenous disturbances (e.g., gust causing speed disturbance). In some embodiments, feedback 1012, 1016, 1018 and 1022 may be configured to generate feedback forces (e.g., at an actuator) based on the received error signals. For example, feedback 1012, 1016, 1018 and 1022 may generate feedback forces with the intent of counteracting the effect(s) of external disturbances. Additionally or alternatively, feedback 1012, 1016, 1018 and 1022 may be configured to generate feedback forces based on modeling errors. For example, if an incorrect aircraft mass is input into either feed forward 1014 or 1020, the aircraft may accelerate faster or slower than the desired change. Based on determining a difference between the desired acceleration and the measured acceleration, one or more processors may generate an error signal (e.g., included in vehicle sensing 1031) which may be looped into feedback 1012, 1016, 1018 or 1022 to determine an additional force needed to correct the error.

In some embodiments, feedback 1012, 1016, 1018 or 1022 may be disabled. For example, in response to losing position and/or ground speed feedback due to disruption of global position system (GPS) communication, system 1000 may be configured to operate without feedback 1012, 1016, 1018 or 1022 until GPS communication is reconnected.

In some embodiments, feedback 1012, 1016, 1018 or 1022 may receive as input a plurality of measurements as well as a trust value for each measurement indicating whether the measurement is valid. For example, one or more processors of system 1000 may assign a Boolean (true/false) value for each measurement used in system 1000 to indicate that the measurement is trustworthy (e.g., yes) or that the measurement may be invalid (e.g., no). Based on one or more processors identifying a measurement as invalid, feedback 1012, 1016, 1018 or 1022 may omit that measurement for further processing. For example, in response to one or more processors identifying a heading measurement as invalid, feedback 1012, 1016, 1018 or 1022 may omit subsequent heading measurements in determining feedback force(s).

In some embodiments, feedback 1012, 1016, 1018 or 1022 may determine one or more feedback forces based on actuator state information received from one or more sensors (e.g., included in vehicle sensing 1031). For example, in response to actuator state information indicating that there is a failure of an actuator, one or more processors of system 1000 may update one or more processes of System 1000 and determine an alternative command to achieve the desired change. For example, one or more processors of system 1000 may adjust one or more model(s), function(s), algorithm(s), table(s), input(s), parameter(s), threshold(s), and/or constraint(s) in response to the failure of an actuator. Alternative command(s) (e.g., yaw, pitch, roll, thrust, or torque) may be determined based on the adjustment(s). Additionally or alternatively, in response to actuator state information indicating that one or more actuators are at a maximum value, one or more processors of system 1000 may update one or more processes of system 1000 (e.g., as described above) and determine an alternative command to achieve the desired change.

Total desired forces may be calculated based on outputs of feedback 1012, 1016, 1018 and 1022 and feed forward 1014 and 1020. For example, one or more processors of system 1000 may calculate a desired turn-rate force by summing the outputs of feedback 1012 and feed forward 1014. Additionally or alternatively, one or more processors of system 1000 may calculate a desired lateral force by summing the outputs of feedback 1016 and feed forward 1014. Additionally or alternatively, one or more processors of system 1000 may calculate a desired vertical force by summing the outputs of feedback 1018 and feed forward 1020. Additionally or alternatively, one or more processors of system 1000 may calculate a desired longitudinal force by summing the outputs of feedback 1022 and feed forward 1020.

Lateral/directional outer loop allocation 1024 and longitudinal outer loop allocation 1026 may each be configured to receive as input one or more desired forces and data received from vehicle sensing 1031 (e.g., airspeed, vehicle orientation, vehicle load factor, measured acceleration, vehicle mass and inertia, indications of working/failed actuators, air density, altitude, aircraft mode, whether the aircraft is in the air or on the ground, etc.). Based on the inputs, outer loop allocations 1024 and 1026 may be configured to command roll, command yaw, command pitch, demand thrust, or output a combination of different commands/demands in order to achieve the one or more desired forces.

Lateral/Directional Outer Loop Allocation 1024 may receive as input a desired turn-rate force and/or a desired lateral force and may command roll or command yaw. In some embodiments, Lateral/Directional Outer Loop Allocation 1024 may determine output based on a determined flight mode. A flight mode may be determined using pilot inputs (e.g., a selected mode on an inceptor) and/or sensed aircraft information (e.g., an airspeed). For example, Lateral/Directional Outer Loop Allocation 1024 may determine a flight mode of the aircraft using at least one of a determined (e.g., sensed or measured) airspeed or an input received at a pilot inceptor button (e.g., an input instructing the aircraft to fly according to a particular flight mode). In some embodiments, Lateral/Directional Outer Loop Allocation 1024 may be configured to prioritize a pilot inceptor button input over measured airspeed in determining the flight mode (e.g., the pilot inceptor button is associated with a stronger weight or higher priority than a measured airspeed). In some embodiments, Lateral/Directional Outer Loop Allocation 1024 may be configured to blend (e.g., using weighted summation) the determined airspeed and pilot inceptor button input to determine the flight mode of the aircraft. In a hover flight mode, Lateral/Directional Outer Loop Allocation 1024 may achieve the desired lateral force with a roll command (e.g., roll angle, roll rate) and may achieve the desired turn-rate force with a yaw command. In some embodiments, such as in hover flight mode, the aircraft may be configured to not be able to accelerate outside a predetermined hover envelope (e.g., hover speed range). In a forward-flight mode (e.g., horizontal flight), Lateral/Directional Outer Loop Allocation 1024 may achieve the desired lateral force with a yaw command and may achieve the desired turn-rate force with a roll command. In forward flight mode, Lateral/Directional Outer Loop Allocation 1024 may be configured to determine output based on sensed airspeed. In a transition between hover flight mode and forward flight mode, Lateral/Directional Outer Loop Allocation 1024 may achieve desired forces using a combination of a roll command and a yaw command.

Longitudinal Outer Loop Allocation 1026 may receive as input a desired vertical force and/or a desired longitudinal force and may output at least one of a pitch command (e.g., pitch angle) or a thrust vector demand. A thrust vector demand may include longitudinal thrust (e.g., mix of nacelle tilt and front propeller thrust) and vertical thrust (e.g., combined front and rear thrust). In some embodiments, Longitudinal Outer Loop Allocation 1026 may determine output based on a determined flight mode. For example, in a hover flight mode, Longitudinal Outer Loop Allocation 1026 may achieve a desired longitudinal force by lowering a pitch attitude and by using longitudinal thrust, and may achieve a desired vertical force with vertical thrust. In a forward-flight mode, Longitudinal Outer Loop Allocation 1026 may achieve a desired longitudinal force with longitudinal thrust (e.g., front propeller thrust). In a cruise flight mode, longitudinal section 1026 may achieve a desired vertical force by commanding pitch (e.g., raising pitch attitude) and demanding thrust (e.g., increasing longitudinal thrust).

Inner loop control laws 1028 may be configured to determine moment commands based on at least one of a roll command, yaw command, or pitch command from Lateral/Directional Outer Loop Allocation 1024 or Longitudinal Outer Loop Allocation 1026. In some embodiments, Inner loop control laws 1028 may be dependent on sensed vehicle dynamics (e.g., from vehicle sensing 1031). For example, Inner loop control laws 1028 may be configured to compensate for disturbances at the attitude and rate level in order to stabilize the aircraft. Additionally or alternatively, Inner loop control laws 1028 may consider periods of natural modes (e.g., phugoid modes) that affect the pitch axis, and may control the aircraft appropriately to compensate for such natural modes of the vehicle. In some embodiments, inner loop control laws 1028 may be dependent on vehicle inertia.

Inner loop control laws 1028 may determine moment commands using one or more stored dynamics models that reflect the motion characteristics of the aircraft (e.g., the aerodynamic damping and/or inertia of the aircraft). In some embodiments, the Inner loop control laws 1028 may use a dynamic model (e.g., a low order equivalent system model) to capture the motion characteristics of the aircraft and determine one or more moments that will cause the aircraft to achieve the commanded roll, yaw, and/or pitch. Some embodiments may include determining (e.g., by inner loop control laws 1028 or other component) a moment command based on at least one received command (e.g., a roll command, yaw command, and/or pitch command) and a determined (e.g., measured) aircraft state. For example, a moment command may be determined using a difference in the commanded aircraft state and the measured aircraft state. By way of further example, a moment command may be determined using the difference between a commanded roll angle and a measured roll angle. As described below, Control Allocation 1029 may control the aircraft (e.g., through flight elements) based on the determined moment command(s).

For example, Control Allocation 1029 may control (e.g., transmit one or more commands to) one or more electric propulsion system(s) of the aircraft (e.g., electric propulsion system 602 shown in FIG. 6), including tilt actuator(s), electric engine(s), and/or propeller(s). Control Allocation 1029 may further control one or more control surface(s) of the aircraft (e.g., control surfaces, such as flaperons 712 and ruddervators 714 shown in FIG. 7), including flaperon(s), ruddervator(s), aileron(s), spoiler(s), rudder(s), and/or elevator(s). Vehicle dynamics 1030 represents the control of different flight elements (e.g., electric propulsion system(s) and/or control surfaces) and the corresponding effect on the flight elements and aircraft dynamics.

While the embodiment shown in FIG. 10 includes both Inner loop control laws 1028 and Outer loop allocation 1024 and 1026, in some embodiments the flight control system may not include Outer loop allocation 1024 and 1026. Therefore, a pilot inceptor input may create roll, yaw, pitch, and/or thrust commands. For example, a right inceptor may control roll and pitch and a left inceptor and/or pedal(s) may control yaw and thrust.

Control allocation 1029 may accept as inputs one or more of force and moment commands, data received from the one or more aircraft sensors, envelope protection limits, scheduling parameter, and optimizer parameters. Control allocation 1029 may be configured to determine, based on the inputs, actuator commands by minimizing an objective function that includes one or more primary objectives, such as meeting commanded aircraft forces and moments, and one or more secondary, which can include minimizing acoustic noise and/or optimizing battery pack usage.

In some embodiments, control allocation 1029 may be configured to compute the limits of individual actuator commands based on the actuator states and envelope protection limits. In normal operation, the minimum command limit for a given actuator includes the maximum of: the minimum hardware based limit and the minimum flight envelope limit; and the maximum command limit for a given actuator includes the minimum of: the maximum hardware based limit and the maximum flight envelope limit. In the case of an actuator failure, the command limits for the failed actuator correspond to the failure mode.

Control allocation 1029 sends commands to one or more flight elements to control the aircraft. The flight elements will move in accordance with the controlled command. Various sensing systems and associated sensors as part of Vehicle Dynamic Sensing 1031 may detect the movement of the flight elements and/or the dynamics of the aircraft and provide the information to Feedback 1012, 1016, 1018, 1022, Outer Loop allocation 1024 and 1026, Inner Loop Control laws 1028, and Control Allocation 1029 to be incorporated into flight control.

As described above, vehicle sensing 1031 may include one or more sensors to detect vehicle dynamics. For example, vehicle sensing 1031 may capture how the aircraft moves in response to pilot inputs, propulsion system outputs or ambient conditions. Additionally or alternatively, vehicle sensing 1031 may detect an error in the aircraft's response based on exogenous disturbances (e.g., gust causing speed disturbance). Further, vehicle sensing 1031 may include one or more sensors to detect propeller speed, such as a magnetic sensor (e.g., Hall effect or inductive sensor) or optical sensors (e.g., a tachometer) to detect the rotor speed of the aircraft engine (and thereby the speed of the propeller). Vehicle sensing 1031 may include one or more sensors to detect nacelle tilt angle (e.g., a propeller rotation axis angle between a lift configuration (e.g., FIG. 2) and forward thrust configuration (e.g., FIG. 1)), such as a magnetic sensor (e.g., Hall effect or inductive sensor). Vehicle sensing 1031 may include one or more sensors configured to detect an engine torque and/or thrust, such as one or more current sensors or voltage sensors, strain gauges, load cells, and/or propeller vibration sensors (e.g., accelerometers).

Vehicle sensing 1031 may include one or more sensors configured to detect vehicle dynamics, such as acceleration and/or pitch orientation sensors (e.g., accelerometer(s), 3-axis accelerometer(s), gyroscope(s), and/or 3-axis gyroscope(s)) and airspeed sensors (e.g., pitot tube sensors). Vehicle sensing 1031 may further include one or more inertial measurement units (IMUs) to determine an aircraft state based on these measurements. An aircraft state may refer to forces experienced by, an orientation of, a position of (e.g., altitude), and/or movement of, the aircraft. For example, an aircraft state may include at least one of: a position of the aircraft (e.g., a yaw angle, roll angle, pitch angle, and/or any other orientation across one or two axes), velocity of the aircraft, angular rate of the aircraft (e.g., roll, pitch, and/or yaw rate), and/or an acceleration of the aircraft (e.g., longitudinal, lateral and/or vertical acceleration), or any physical characteristic of the aircraft or one of its components. In some embodiments, vehicle sensing 1031 may include an inertial navigation systems (INS) and/or an air data and/or an attitude heading reference systems (ADAHRS). The inertial navigation systems (INS) and/or an air data and attitude heading reference systems (ADAHRS) may include one or more inertial measurement units (IMUs) and corresponding sensors (e.g., accelerometers, gyroscopes, three-axis gyroscopes, and/or three-axis accelerometers). In some embodiments, the INS and/or ADAHRS may filter and/or otherwise process sensor measurements to determine an aircraft state (e.g., acceleration or angular rate). For example, in some embodiments, the INS and/or ADAHRS may determine angular rates based on gyroscope measurements and may determine acceleration based on measurements from an accelerometer.

DCPS 1033 may receive as inputs from control allocation 1029 and vehicle sensing 1031. For example, DCPS 1033 may receive at least one or more torque commands, one or more limits (e.g., envelope protection limits, engine torque rate limits, HV bus protection torque limits, etc.), or measured vehicle dynamics (e.g., measured RPM, measured voltage, etc.). DCPS 1033 may be configured to modify, based on the inputs, the one or more torque commands to dynamically generate one or more modified torque commands (e.g., dynamically varied torque commands). System 1000 may be configured to send the one or more dynamically modified torque commands to one or more engines of the aircraft. The disclosed embodiments may improve engine response to enhance aircraft stability and safety.

Figure 11:
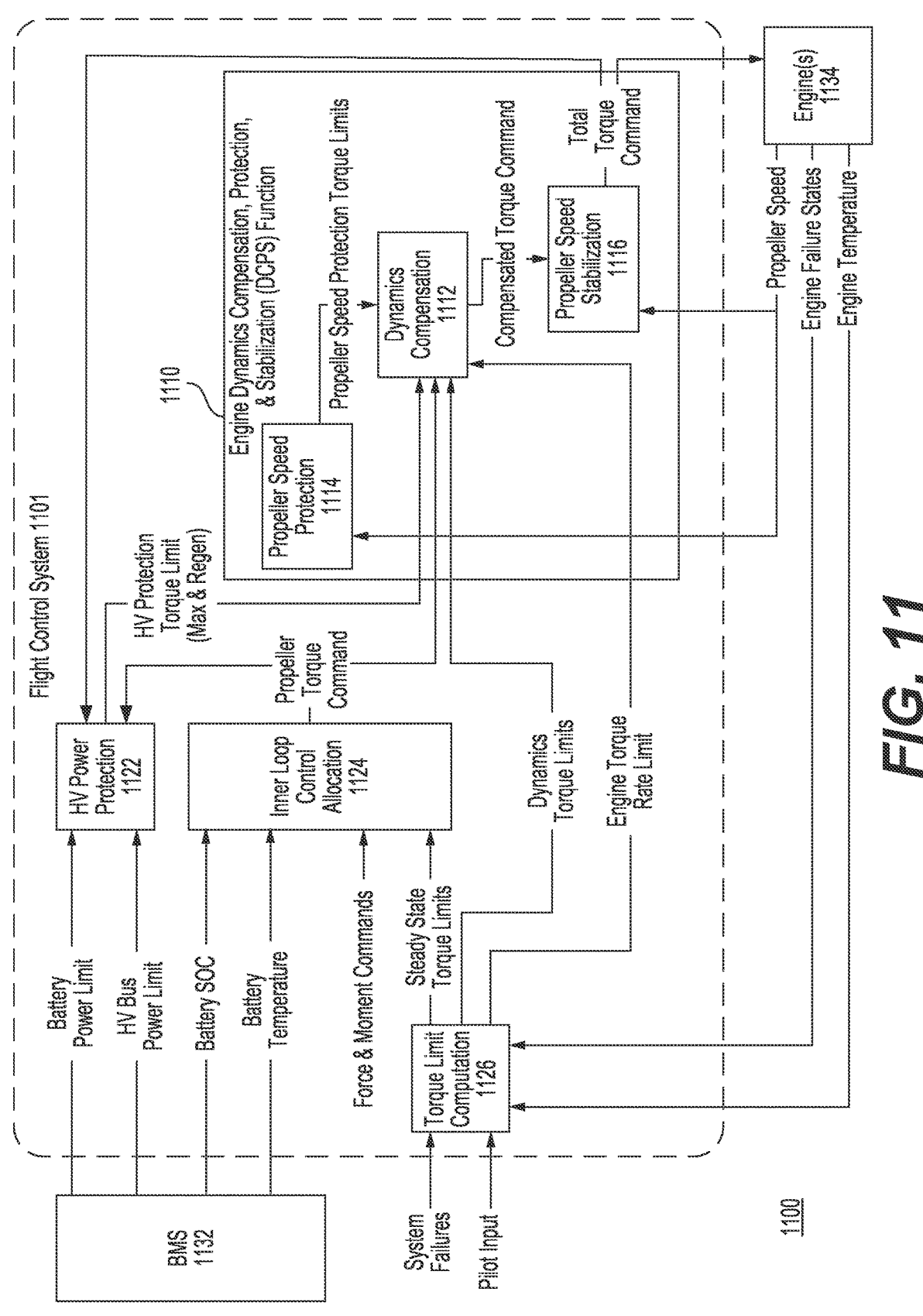
FIG. 11 illustrates a functional block diagram of an exemplary control system of an aircraft, consistent with disclosed embodiments.

FIG. 11 is a functional block diagram of an exemplary system 1100 of a VTOL aircraft including a flight control system with a DCPS function, consistent with disclosed embodiments. As illustrated in FIG. 11, system 1100 may include flight control system 1101, which may include engine dynamics compensation, protection, and stabilization (DCPS) function 1110, which may include dynamics compensation unit 1112, propeller speed protection unit 1114, and propeller speed stabilization unit 1116. System 1101 may further include HV power protection function 1122 and inner loop control allocation function 1124 configured to receive data from BMS (battery management system(s)) 1132, and torque limit computation function 1126 configured to receive data from one or more engines 1134. System 1101 may be implemented by a microprocessor-based controller executing software code (e.g., a computer program) stored in a storage medium (e.g., a computer-readable medium, such as a non-transitory computer-readable medium) to implement the functions described herein. System 1101 may also be implemented in hardware, or a combination of hardware and software. System 1101 may be configured to perform a single step or sequence repeatedly until a desired or commanded outcome is achieved. It is to be understood that many of conventional functions of the control system are not shown in FIG. 11 for ease of description.

In some embodiments, DCPS function 1110 may include dynamics compensation unit 1112 configured to perform dynamics compensation. An engine produces thrust by spinning a propeller through the air, and the thrust produced may be proportional to the square of the angular speed of the propeller for a given environment and propeller/aircraft configuration. When the propeller is spinning at a given speed (e.g., is at a steady state condition), the engine torque (e.g., Qss, steady state engine torque) required to keep the propeller spinning may be counteracting the friction in the engine and the aerodynamic resistance due to the atmosphere. Therefore, engine torque, thrust and propeller speed may be proportional to each other in steady state conditions, and the relationship may be represented as follows:

$$\text{Thrust}_{SteadyState} \approx RPM^2_{SteadyState} \approx (\text{Engine} \mid \text{Propeller})\text{Torque}_{SteadyState}$$

In dynamic conditions (e.g., not steady state), while propeller speed squared ($\Omega^2$) may be proportional to thrust (T) produced, engine torque ($Q_{Engine}$) may no longer be proportional to $\Omega^2$ and T. In order to change the thrust generated by the propeller, DCPS function 1110 may be configured to adjust propeller speed (e.g., accelerate/decelerate the propeller). In some embodiments, flight control system 1101 may be configured to compensate for mechanical and aerodynamic inertia of the aircraft by dynamically modifying one or more torque commands to the one or more engines. In the following equation, $Q_{Dyn}$ may be a component to rapidly speed up or slow down an engine:

$$T = Q_{SS} + Q_{Dyn}$$

In some embodiments, the thrust generated may be proportional to the aerodynamic torque (e.g., load on an engine), and the relationship between aerodynamic torque and engine torque may be written as follows:

$$\frac{Q_{Engine}}{KT_{Aero}} = \frac{Q_{Engine}}{Q_{Aero}} = \left( \frac{N^2 I_{motor} + I_{propeller}}{2 \frac{\rho}{\rho_{ref}} \frac{\delta Q}{\delta \Omega^2} (\Omega_{propeller} - \Omega_{ZeroTorque})} \right) s + 1$$

where:

| $\left( \dfrac{N^2 I_{motor} + I_{propeller}}{2\dfrac{\rho\delta Q}{\rho_{ref}\delta\Omega^2}(\Omega_{propeller} - \Omega_{ZeroTorque})} \right)$ | dynamics compensation gain |
|---|---|
| s | gain may only be on aerodynamic torque rate, so the compensation may be a function of how quickly thrust is trying to be changed |
| 1 | steady state gain may be 1, e.g., in steady state conditions the aerodynamic torque may be the same as the engine torque |

In some embodiments, flight control system 1101 may be configured to compute a desired aerodynamic torque and convert the computed desired torque to an engine torque command using the above relationship. The characteristics of the propeller, tilt angle, blade pitch, aircraft mold line, and environmental conditions (airspeed, air density) may determine thrust generated for a given engine torque output. In some embodiments, in order to compute desired net forces and convert the desired forces into actuator commands, flight control system 1101 may be configured to ensure that a reaction torque on the aircraft is balanced. In some embodiments, the intrinsic output of a motor may be torque. In some embodiments, an engine may operate on torque and the motor may be configured to precisely measure and control its torque output. In some embodiments, no matter whether a thrust command or a torque command is communicated to the engine, the compensation may remain the same.

In some embodiments, DCPS function 1110 may include dynamics compensation unit 1112 to generate one or more dynamically compensated torque commands. Doing so may enable engine thrust to have a fast response to commands. For example, some aircrafts may be configured such that blade pitch changes as a function of tilt angle and such that pitch control is not independent or fast, which may not enable a fast thrust response. In some embodiments, DCPS function 1110 may only be capable of being implemented through engine torque. The need for an accurate dynamics compensation function may further be emphasized by a wide range of aerodynamic loads experienced by propellers.

In some embodiments, dynamics compensation unit 1112 may generate one or more compensated torque commands based on one or more fixed characteristics of the aircraft, one or more conditions of the aircraft, one or more flight control laws, one or more limits, or a combination thereof. For example, there may be certain limitations associated with engines such that the total torque output of each engine is not infinite. While engine torque may be used to counteract steady state mechanical and aerodynamic friction to maintain an RPM that a propeller is spinning at and/or may be used to speed up or slow down a propeller, certain constraints (e.g., flight condition, failures, thermal operational limits, etc.) may limit a rate at which an engine can generate torque or how quickly a propeller may be accelerated. Therefore, dynamics compensation unit 1112 may be configured to use known characteristics of engines and propellers to generate one or more compensated (e.g., dynamically modified) torque commands that preemptively account for limitations, such that flight control system 1101 receives predictable and fast responses from the engines.

One or more fixed characteristics of the aircraft may include one or more of one or more fixed propeller limits, one or more fixed propulsion unit limits (e.g., fixed electric propulsion unit limits), a position of each engine on the aircraft, a mass that is spinning (e.g., mass of each motor and propeller), or a mass of each gearbox of one or more gearboxes. In some embodiments, a fixed characteristic may refer to any characteristic or attribute that remains constant (or within a tolerance margin of a fixed value) throughout an operational lifespan of an aircraft. Additionally or alternatively, a fixed characteristic may refer to any characteristic inherent to a design, structure, or performance of the aircraft that does not change regardless of any operational conditions or modifications.

A condition of the aircraft (i.e., aircraft condition) may comprise at least one of an airspeed of the aircraft, an air density, a propeller speed of one or more propellers, a propeller airflow of one or more propellers, a tilt angle of each propulsion unit of one or more propulsion units, an airflow associated with a tilt angle of each propulsion unit of one or more propulsion units, or a blade pitch of each propulsion unit of one or more propulsion units.

Flight control law(s) may comprise a set of mathematical functions or algorithms (e.g., inner loop, outer loop, control allocation, etc.) that govern how control surfaces of the aircraft respond to pilot inputs and external factors. For example, one or more flight control laws may include inner loop control allocation function 1124 (e.g., corresponding to control allocation 1029 of FIG. 10) which may be configured to, based on one or more of force and moment commands, battery data, or steady state torque limits, determine one or more propeller torque commands, which may be received as input by dynamics compensation unit 1112 and HV power protection 1122.

One or more limits may comprise at least one of one or more high-voltage (HV) protection torque limits (e.g., max and regen) from HV power protection 1122, dynamic torque limits or engine torque rate limits from torque limit computation 1126, or propeller speed protection torque limits from propeller speed protection unit 1114.

HV power protection function 1122 may be configured to determine one or more HV protection torque limits based on battery data. Flight control system 1101 may receive battery data from one or more battery management systems (BMS) 1132. In some embodiments, battery data may include one or more of a battery power limit associated with each battery, an HV bus power limit associated with each HV bus connected to one or more batteries, a state of charge (SOC) of each battery, or a temperature of each battery. In some embodiments, HV power protection function 1122 may be further configured to determine one or more HV protection torque limits based on one or more propeller torque commands (e.g., biasing factor) from inner loop control allocation 1124 and one or more total torque commands from engine DCPS function 1110.

In some embodiments, dynamics compensation 1112 may be configured to determine a dynamics compensation gain component ($K_{Dyn}$) using the following:

$$K_{Dyn} = \left( \frac{N^2 I_{motor} + I_{propeller}}{2 \frac{\rho}{\rho_{ref}} \frac{\delta Q}{\delta \Omega^2}(\Omega_{propeller} - \Omega_{ZeroTorque})} \right)$$

where:

| | |
|---|---|
| $N$ | gearbox gear ratio |
| $N^2 I_{motor} + I_{propeller}$ | mass that is spinning (e.g., mass of engine and propeller), wherein $I_{propeller}$ may differ between lift propellers and tilt propellers (e.g., tilt propellers may be configured for variable pitch, which could change $I_{propeller}$) |
| $\dfrac{\rho}{\rho_{ref}}$ | density ratio (e.g., thickness of the air, ratio of 1 may be considered normal) |
| $\Omega_{propeller}$ | current speed of the propeller |

| | |
|---|---|
| $\Omega_{ZeroTorque}$ | windmilling speed of the propeller (e.g., speed at which a propeller may rotate due to natural air flow rather than engine power) |
| $\dfrac{\delta Q}{\delta \Omega^2}$ | aerodynamic properties of the propeller (e.g., capturing relationship between propeller speed, torque and thrust), may differ between lift propellers (e.g., defined by position of lift propeller engine on aircraft and airspeed of the aircraft) and tilt propellers (e.g., defined by position of tilt propeller engine on aircraft, airspeed of the aircraft, tilt angle of propeller, and blade pitch of propeller) |

Figure 12A:
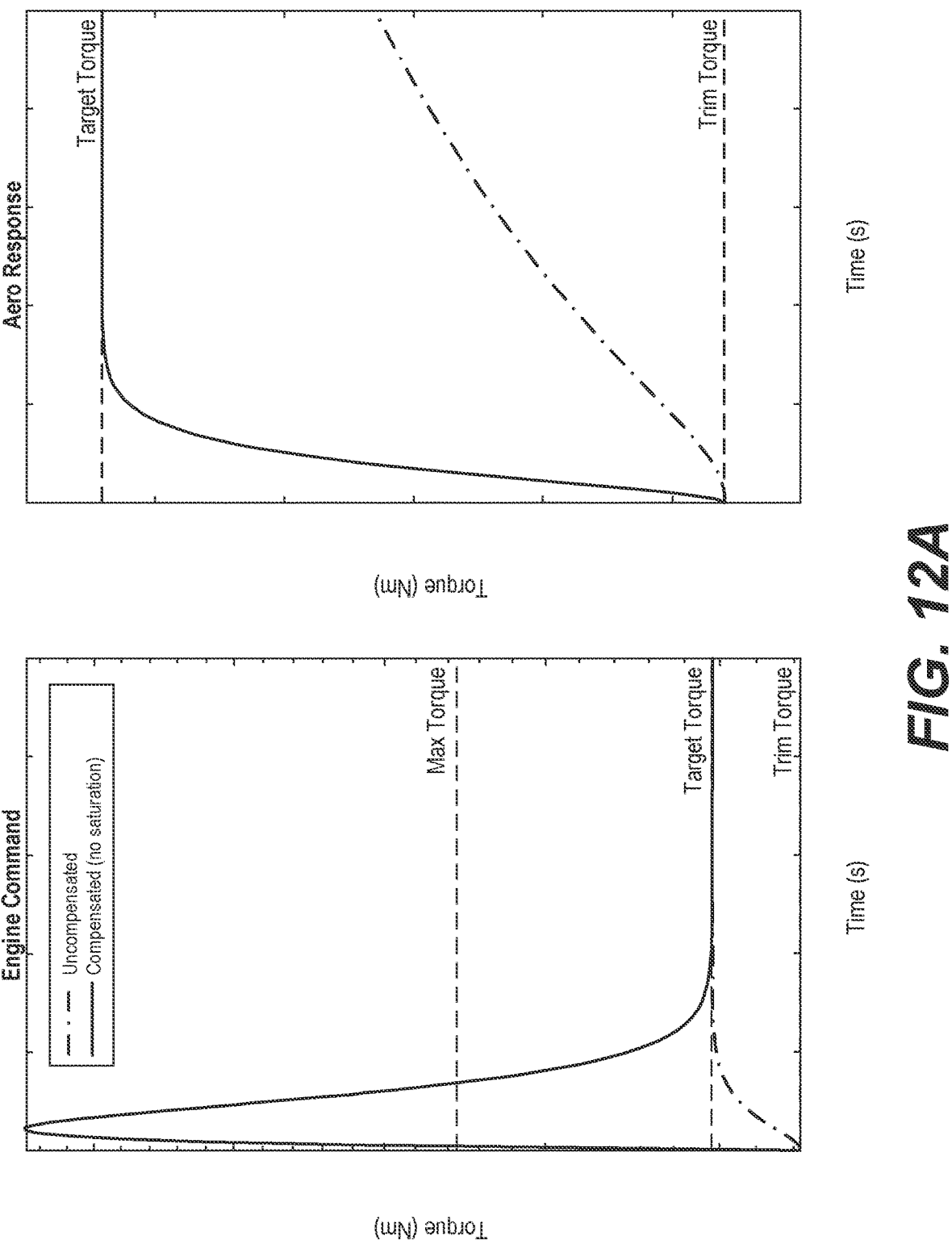
FIGS. 12A-12C illustrate plots for exemplary propulsion unit commands and responses, according to various disclosed embodiments.

FIG. 12A illustrates an exemplary engine command and response, consistent with disclosed embodiments. The "Engine Command" graph shows a "Max Torque" line and "Target Torque" line, wherein the space between may be referred to a torque margin (max-operating) that determines available compensation. The "Uncompensated" line shows that in response to an engine command as shown, the response would be very slow and likely insufficient to stabilize or control the aircraft. The "Compensated (no saturation)" line shows that in an ideal world with engines that have infinite capabilities, in response to an engine command far above the "Max Torque" line as shown (e.g., beyond normal engine capabilities), the response would be very quick and match the command exactly.

Figure 12B:
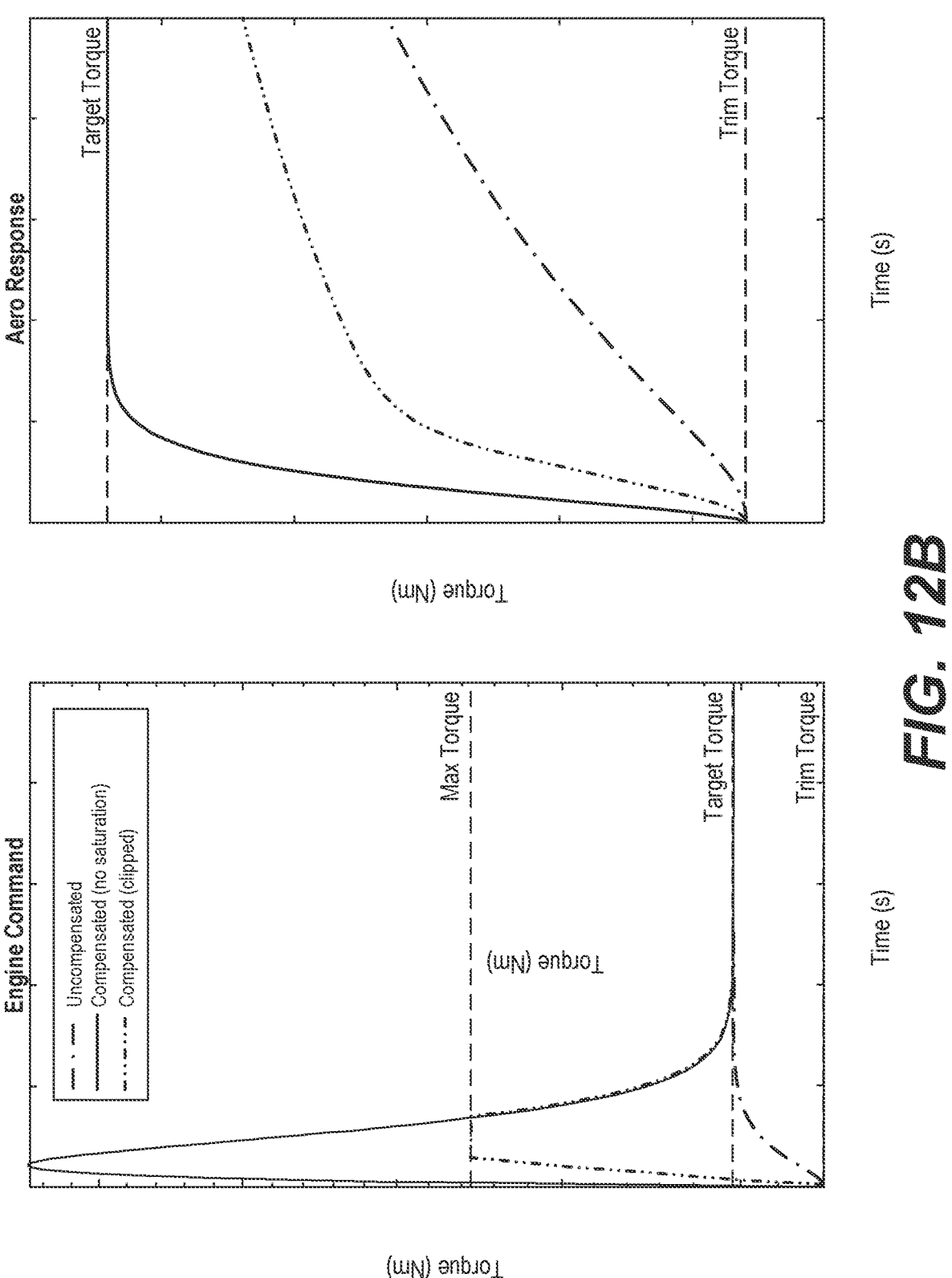

In the real world, any out-of-range commands sent to the engines may be clipped, as shown in FIG. 12B which illustrates an exemplary engine command and response, consistent with disclosed embodiments. For example, the "Compensated (clipped)" line shows that commands too fast for the engine to follow may be slowed down. In addition, clipped dynamics compensation may lead to poor aerodynamic torque and thrust response, may be very unpredictable, and thus may also be insufficient to stabilize or control the aircraft.

Figure 12C:
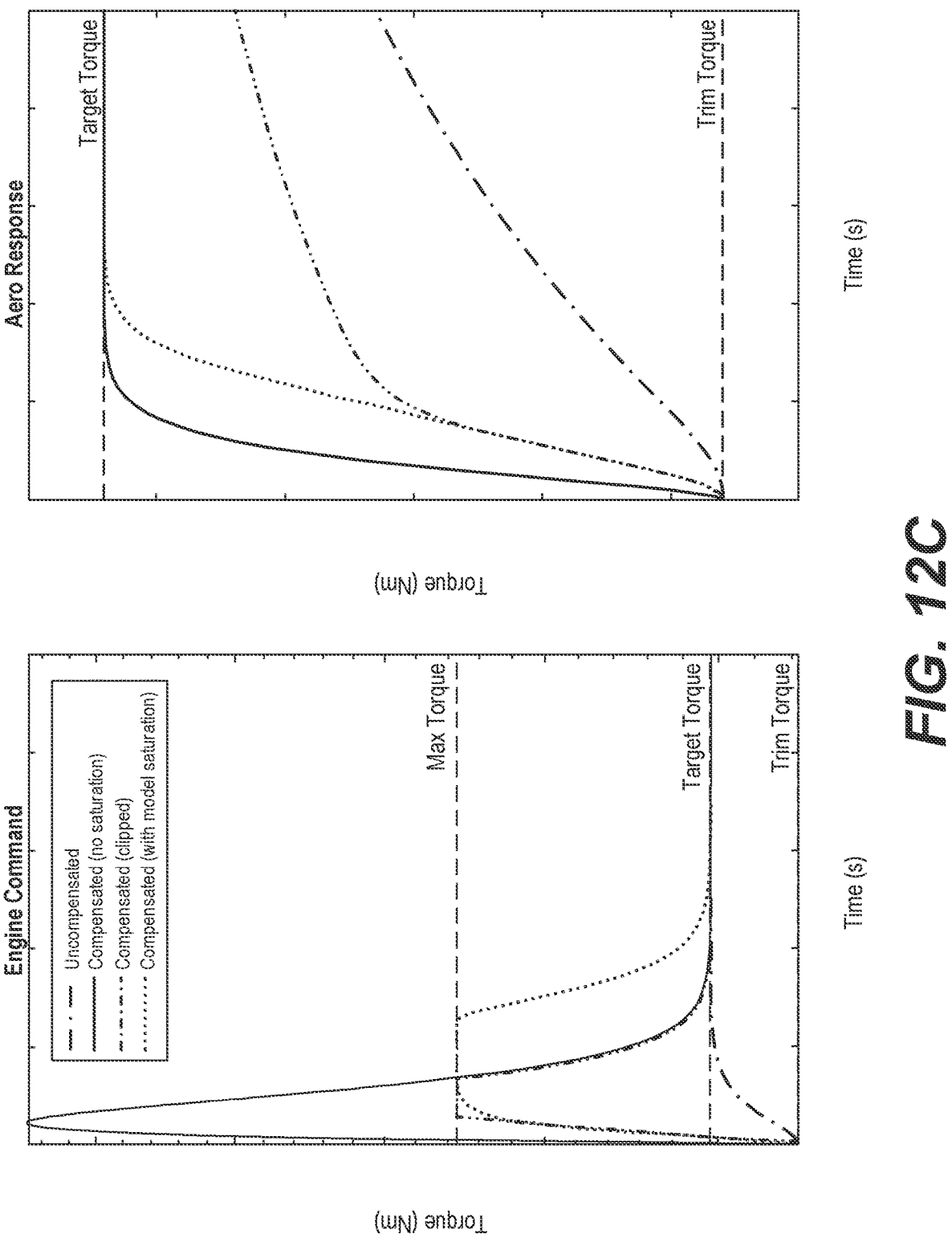

FIG. 12C illustrates an exemplary engine command and response, consistent with disclosed embodiments. The "Compensated (with model saturation)" line shows that by compensating for the engine limits (e.g., rate at which engine torque command is increasing and max torque command are limited), a flight control system may ensure a correct amount of compensation. In addition, while the response is slower than the ideal response of the "Compensated (no saturation)" line due to engine limitations, the model saturated command may still be fast and predictable enough to stabilize and control the aircraft.

In some embodiments, DCPS function 1110 may include propeller speed protection unit 1114 to generate one or more propeller speed protection torque limits. For example, the speed of a propeller may be a result of environmental conditions, flight conditions, aircraft configuration, and/or a torque applied by an engine of the propeller. A propeller spinning too fast may lead to structural failure, and thus when an unforeseen failure or event results in the propeller spinning too fast, the engine may be configured with hard protections to initially attempt to slow down or otherwise shut down the engine to avoid structural failure. Preferably, such hard protections may be avoided by taking preemptive actions to prevent the propeller from spinning too fast in the first place. For example, propeller speed protection function 1114 may be configured to compute one or more propeller acceleration limits which may then be converted to one or more propeller maximum speed protection torque limits. The computation may be performed as follows:

$$\dot{\Omega}_{UpLim} = \begin{cases} K\tau(\Omega_{Max} - \Omega_{Meas}) & \text{if } \Omega_{Meas} > \Omega_{Max} \\ \tau(\Omega_{Max}^2 - \Omega_{Meas}|\Omega_{Meas}|) & \text{otherwise} \end{cases}$$

where:

| | |
|---|---|
| $\Omega_{Meas}$ | measured propeller speed |
| $\Omega_{Max}$ | maximum propeller speed limit |
| $\tau$ | time constant with which the model should approach $\Omega_{Max}$ |
| $K$ | gain to speed up the time constant when the measured speed has exceeded the limit speed |

$$\dot{Q}_{Lim} = 2 \frac{1}{N} \frac{\rho}{\rho_{ref}} \frac{\delta Q}{\delta \Omega^2} \dot{\Omega}_{Lim}$$

where:

| | |
|---|---|
| $N$ | engine gear ratio |
| $\dfrac{\rho}{\rho_{ref}}$ | density ratio |
| $\dfrac{\delta Q}{\delta \Omega^2}$ | torque to propeller speed aerodynamic derivative for the propeller |

In some embodiments, propeller speed protection function 1114 may be configured to generate one or more low speed protection limits (e.g., one or more limits designated for a boundary of speed that is lower than another boundary of speed, such as a high speed protection limit). For example, when a propeller is spinning too slow, an electric engine may no longer properly control torque output due to degradation in sensor measurements. Should the engine enter this state, while it may be able to recover, there is likely a time delay before it can do so which may result in an engine response that is neither fast nor predictable. Therefore, DCPS function 1110 may be configured to perform one or more preemptive actions to prevent propellers from getting to such low speed conditions. For example, propeller speed protection function 1114 may be configured to compute one or more propeller acceleration limits which may then be converted to one or more propeller minimum speed (e.g., low speed) protection torque limits. The computation may be performed as follows:

$$\dot{\Omega}_{LoLim} = \begin{cases} K\tau(\Omega_{Min} - \Omega_{Meas}) & \text{if } \Omega_{Meas} > \Omega_{Min} \\ \tau(\Omega_{Min}^2 - \Omega_{Meas}|\Omega_{Meas}|) & \text{otherwise} \end{cases}$$

where:

| | |
|---|---|
| $\Omega_{Meas}$ | measured propeller speed |
| $\Omega_{Min}$ | minimum propeller speed limit |
| $\tau$ | time constant with which the function should approach $\Omega_{Min}$ |
| K | gain to speed up the time constant when the measured speed has exceeded the limit speed |

$$\dot{Q}_{Lim} = 2\frac{1}{N}\frac{\rho}{\rho_{ref}}\frac{\delta Q}{\delta\Omega^2}\dot{\Omega}_{Lim}$$

where:

| | |
|---|---|
| N | engine gear ratio |
| $\dfrac{\rho}{\rho_{ref}}$ | density ratio |
| $\dfrac{\delta Q}{\delta\Omega^2}$ | torque to propeller speed aerodynamic derivative for the propeller |

In some embodiments, propeller speed protection function 1114 may be configured to generate one or more high speed protection limits (e.g., one or more limits designated for a boundary of speed that is higher than another boundary of speed, such as a low speed protection limit). For example, a propeller spinning too fast may lead to structural failure. While the engines may have hard protections to slow down or shut down in the case of unforeseen events that cause a propeller to spin too fast, doing so may risk stability of the aircraft and may prevent engine thrust from having a fast response to commands as desired. Therefore, DCPS function 1110 may be configured to perform one or more preemptive actions to prevent propellers from getting to such high speed conditions. For example, propeller speed protection function 1114 may be configured to compute one or more propeller acceleration limits which may then be converted to one or more propeller maximum speed (e.g., high speed) protection torque limits. The computation may be performed as follows:

$$\dot{\Omega}_{UpLim} = \begin{cases} K\tau(\Omega_{Max} - \Omega_{Meas}) & \text{if } \Omega_{Meas} > \Omega_{Max} \\ \tau(\Omega_{Max}^2 - \Omega_{Meas}|\Omega_{Meas}|) & \text{otherwise} \end{cases}$$

where:

| | |
|---|---|
| $\Omega_{Meas}$ | measured propeller speed |
| $\Omega_{Max}$ | maximum propeller speed limit |

-continued

| | |
|---|---|
| $\tau$ | time constant with which the model should approach $\Omega_{Max}$ |
| K | gain to speed up the time constant when the measured speed has exceeded the limit speed |

$$\dot{Q}_{Lim} = 2\frac{1}{N}\frac{\rho}{\rho_{ref}}\frac{\delta Q}{\delta\Omega^2}\dot{\Omega}_{Lim}$$

where:

| | |
|---|---|
| N | engine gear ratio |
| $\dfrac{\rho}{\rho_{ref}}$ | density ratio |
| $\dfrac{\delta Q}{\delta\Omega^2}$ | torque to propeller speed aerodynamic derivative for the propeller |

Figure 13:
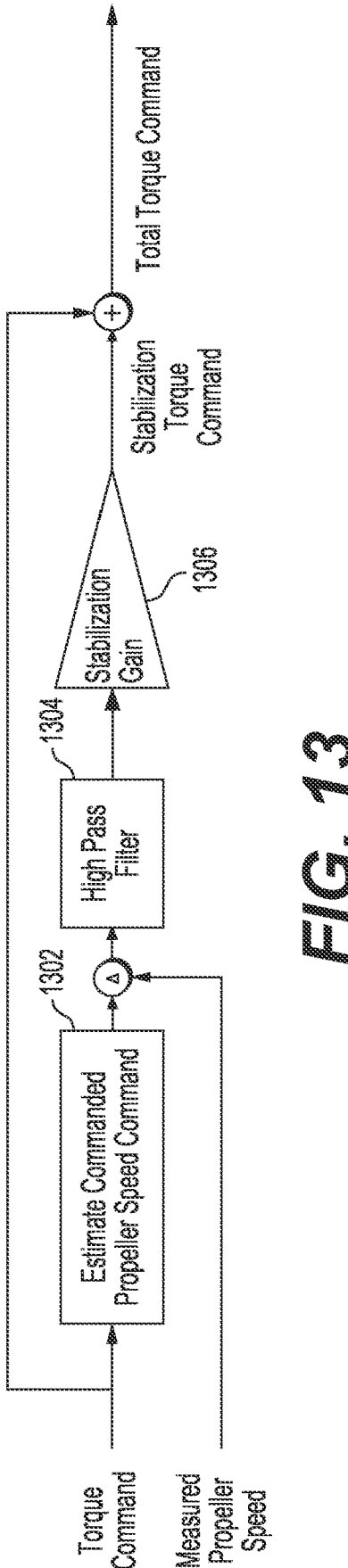
FIG. 13 illustrates a flow diagram of an exemplary configuration for speed stabilization of an engine, according to various disclosed embodiments.

In some embodiments, the DCPS function may include a speed stabilization function (e.g., propeller speed stabilization unit 1116). FIG. 13 illustrates an exemplary speed stabilization function 1300, according to some embodiments of the present disclosure. Speed stabilization function 1300 may be configured to estimate one or more propeller speed commands 1302 based on one or more torque commands received from dynamics compensation (e.g., compensated torque command from dynamics compensation 1112 of FIG. 11). Speed stabilization function 1300 may be configured to compare the one or more estimated propeller speed commands to one or more measured propeller speeds to identify how much to speed up or slow down one or more propellers. In some embodiments, speed stabilization function 1300 may be configured to utilize one or more high pass filters 1304 configured to filter out low-frequency variations in speed while allowing higher-frequency variations to pass through. Doing so may improve speed stabilization of the aircraft by removing slow-changing disturbances (e.g., noise). Speed stabilization function 1300 may be configured to determine stabilization gain 1306 based on filtering the difference in propeller speed to generate one or more stabilization torque commands. Speed stabilization function 1300 may be configured to output one or more total torque commands by summing the one or more torque commands received from dynamics compensation with the one or more stabilization torque commands. In some embodiments, each engine may receive a total torque command specific to the engine.

The speed stabilization function may be configured to ensure that changes in propeller configuration (tilt or pitch) or the aircraft speed do not result in un-commanded changes in thrust. For example, the speed stabilization function may be configured to provide damping of un-commanded propeller speed changes caused by external torque disturbances. In some embodiments, the speed stabilization function may be configured to resist un-commanded changes in propeller thrust by using a higher frequency feedback loop than is possible with inner loop control laws. The speed stabilization function may reduce variability in aircraft response with model uncertainty, may provide more stable propeller speed, and may provide damping versus speed setpoint tracking to minimize an impact of misleading propeller speed and air-density measurements.

Torque limit computation function 1126 may be configured to determine one or more limits. For example, torque limit computation 1126 may be configured to determine at least one of one or more steady state torque limits, one or more dynamic torque limits, or one or more engine torque rate limits, based on at least one of system failures, pilot input, or engine data from one or more engines 1134. Engine data from one or more engines may comprise at least one of engine failure states or a temperature of each engine.

Figure 14:
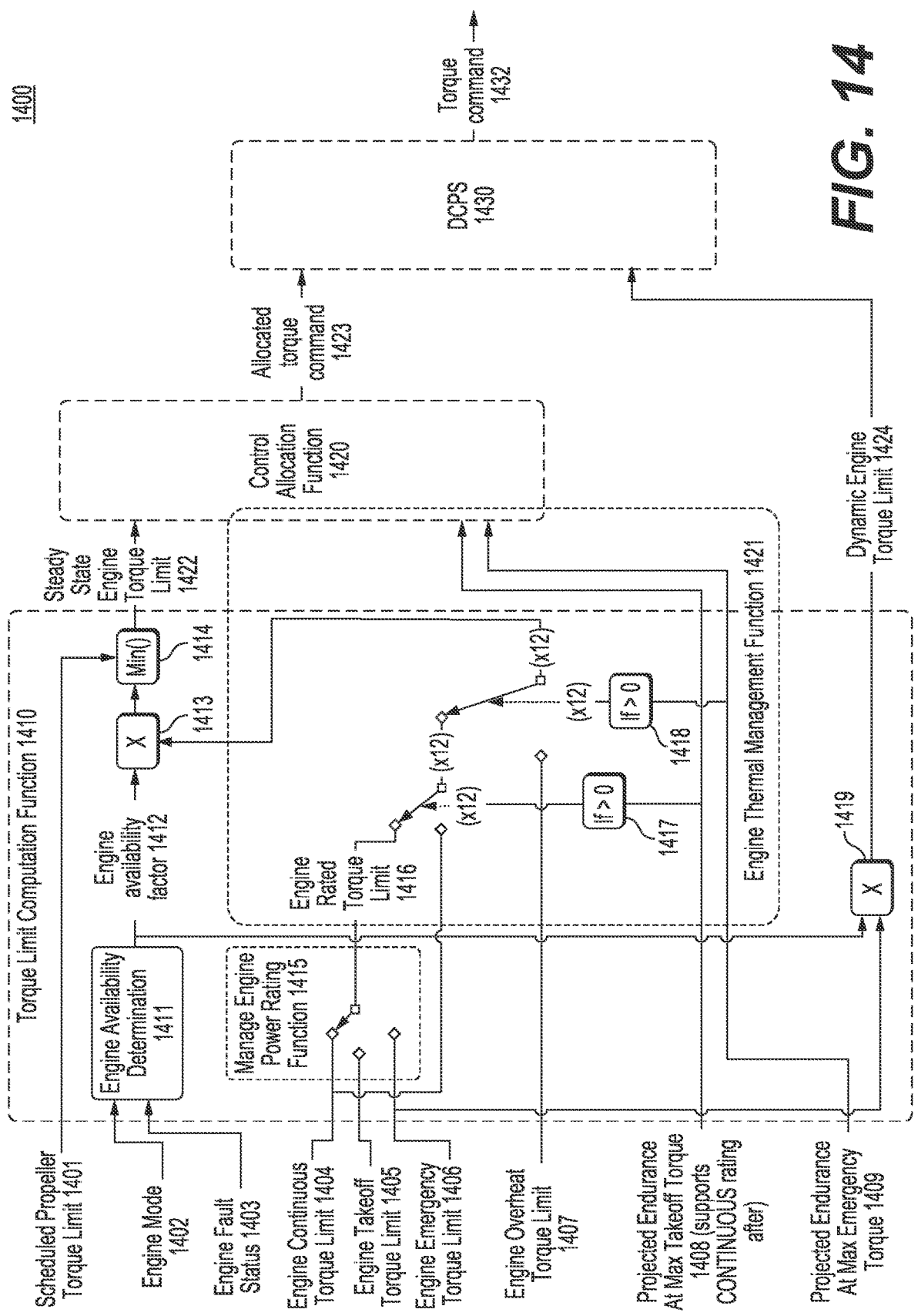
FIG. 14 illustrates a block diagram of an exemplary control system of an aircraft, according to various disclosed embodiments.

FIG. 14 is a functional block diagram of an exemplary system 1400 of a VTOL aircraft including a torque limit computation function (e.g., torque limit computation function 1126), consistent with disclosed embodiments. It is appreciated that a particular machine (e.g., an aircraft) may use an exemplary system 1400 to implement an improvement to the technical fields of aircraft safety, stability, reliability, and efficiency. For example, some embodiments may involve dynamically varying torque commands based on at least one aircraft condition, which can in turn be used by propulsion units to help make the aircraft safer, more stable, easier to fly, more reliable, and more efficient, for example, during different phases or modes of flight, consistent with disclosed embodiments. As illustrated in FIG. 14, system 1400 may include torque limit computation function 1410, control allocation function 1420 and DCPS 1430. System 1400 may be implemented by a microprocessor-based controller executing software code stored in a storage medium to implement the functions described herein. System 1400 may also be implemented in hardware, or a combination of hardware and software. System 1400 may be configured to perform a single step or sequence repeatedly until a desired or commanded outcome is achieved. It is to be understood that many of conventional functions of the control system are not shown in FIG. 14 for ease of description.

In some embodiments, torque limit computation function 1410 may be configured to receive at least one of system failures, pilot input, or engine data as input. For example, torque limit computation function 1410 may be configured to receive one or more of scheduled propeller torque limit 1401, engine mode 1402, engine fault status 1403, engine continuous torque limit 1404, engine takeoff torque limit 1405, engine emergency torque limit 1406, engine overheat torque limit 1407, projected endurance at max takeoff torque 1408, or projected endurance at max emergency torque 1409. In some embodiments, one or more inputs may be preset based on at least one of design specifications, structural limitations, or cooling capabilities of the aircraft. For example, one or more inputs may be associated with regulatory values.

In some embodiments, system 1400 may include manage engine power rating function 1415. Manage engine power rating function 1415 may be configured to select an appropriate torque rating (e.g., engine continuous torque limit 1404, engine takeoff torque limit 1405, engine emergency torque limit 1406) for each engine based on phase of flight (e.g., hover, cruise/continuous, transition, takeoff/landing) and one or more operational requirements. For example, function 1415 may be configured to select, based on a determination that the aircraft is in a takeoff or landing phase of flight, engine takeoff torque limit 1405 as the torque rating. Additionally or alternatively, function 1415 may be configured to select, based on a determination that the aircraft is in a cruise phase of flight, engine continuous torque limit 1404 as the torque rating. Additionally or alternatively, function 1415 may be configured to select, based on detecting one or more system failures (e.g., engine failure, damaged aircraft components, etc.), engine emergency torque limit 1406 as the torque rating. In some embodiments, manage power rating function 1415 may comprise an automatic function configured to dynamically switch between torque ratings based on phase of flight, operational requirements and vehicle dynamics (e.g., aircraft conditions, system failures). In some embodiments, manage engine power rating function 1415 may comprise a switch configured to receive pilot input via a toggle feature.

In some embodiments, system 1400 may include engine thermal management function 1421. Engine thermal management function 1421 may be configured to manage engine thermals to ensure that an engine operates within safe parameters to prevent overheating and damage to engine components. For example, engine thermal management function 1421 may be configured to determine, based on the maximum power for each aircraft engine output from manage engine power rating function 1415, engine rated torque limit 1416 of each engine.

Engine rated torque limit 1416 may correspond to a maximum torque that an engine may be capable of producing under normal, continuous operating conditions. In some embodiments, engine thermal management function 1421 may receive one or more of engine overheat torque limit 1407, projected endurance at max takeoff torque 1408, or projected endurance at max emergency torque 1409 from each engine. Based on at least one of projected endurance at max takeoff torque 1401 or projected endurance at max emergency torque 1409, engine thermal management function 1421 may determine which limit (e.g., engine continuous torque limit 1404, engine takeoff torque limit 1405, engine emergency torque limit 1406, engine overheat torque limit 1407, engine rated torque limit 1416) to use for determining steady state engine torque limit 1422. For example, based on a timer for projected endurance at max takeoff torque 1401 indicating time remaining (e.g., greater than 0, the aircraft is capable of sustaining its operation at max takeoff torque) at 1417, engine thermal management function 1421 may use engine rated torque limit 1416 for determining steady state engine torque limit 1422. Additionally or alternatively, based on a timer for projected endurance at max takeoff torque 1401 indicating no time remaining (e.g., not greater than 0) at 1417, engine thermal management function 1421 may use engine continuous torque limit 1404 for determining steady state engine torque limit 1422. Additionally or alternatively, based on a timer for projected endurance at max emergency torque 1409 indicating no time remaining (e.g., not greater than 0, the aircraft is not capable of sustaining its operation at max emergency torque) at 1418, engine thermal management function 1421 may use engine overheat torque limit 1407 for determining steady state engine torque limit 1422. In some embodiments, engine thermal management function 1421 may be configured such that a time buffer exists between timer 1417 and timer 1418 (e.g., such that timer 1417 and timer 1418 do not reach 0 simultaneously).

In some embodiments, engine thermal management function 1421 may be configured to return the torque limit to a normal torque rating after receiving indication of engine cool-down. For example, after setting engine overheat torque limit 1407 as the torque limit for an engine, engine thermal management function 1421 may receive indication that a temperature of the engine has lowered to below a predetermined temperature threshold. Additionally or alternatively, engine thermal management function 1421 may receive an indication that a time remaining for projected endurance at a torque rating (e.g., timer 1418) is greater than a predetermined time threshold (e.g., indicating sufficient cooling of engine). Engine thermal management function 1421 may be configured to set, based on the indication, one of torque limits 1404, 1405 or 1406 as the torque limit of the engine.

In some embodiments, torque limit computation function 1410 may be configured to determine one or more steady state engine torque limits 1422. Determining one or more steady state engine torque limits 1422 may comprise at least one of receiving, retrieving, or checking one or more scheduled propeller torque limits. In some embodiments, the one or more scheduled propeller torque limits 1401 may be determined based on at least one of one or more RPM limits or structural load limits. For example, structural load limits may be associated with loads imparted by one or more of an engine on a propeller hub, rotation of a propeller, propeller blade, mount between propeller and engine, mount between engine and boom, mount between boom and wing, or booms themselves. Additionally or alternatively, the one or more scheduled propeller torque limits 1401 may comprise one or more predetermined values specified for particular aircraft configurations. For example, the one or more scheduled propeller torque limits 1401 may be specified based on propeller design or structural limits of the aircraft. In some embodiments, determining one or more steady state engine torque limits 1422 may comprise determining engine availability 1411. For example, engine availability determination 1411 may comprise determining whether each engine is currently operating and available for control based on one or more of engine mode 1402 (e.g., state of inverter internal state machine, factor of 0 at standby/listening mode, factor of 0 at stow mode, factor of 1 at closed loop torque command mode, etc.) or engine fault status 1403. In some embodiments, engine availability determination 1411 may output engine availability factor 1412. For example, engine availability factor 1412 may comprise a value such as 0 for not operating, 1 for fully operational, and 0.5 for indication of a failure condition (e.g., losing one of two sets of windings causing generation of only about half of a normal amount of torque of an engine). In some embodiments, based on a torque limit (e.g., engine continuous torque limit 1404, engine rated torque limit 1416, engine overheat torque limit 1407) determined by engine thermal management function 1421, torque limit computation function 1410 may combine (e.g., multiply) engine availability factor 1412 with the torque limit at 1413. At 1414, torque limit computation function 1410 may compare scheduled propeller torque limit 1401 to the output of 1413 and may output the lower limit as steady state engine torque limit 1422.

In some embodiments, torque limit computation function 1410 may be configured to determine one or more dynamic engine torque limits 1424. Determining one or more dynamic engine torque limits 1424 may comprise combining (e.g., multiplying) engine availability factor 1412 output from engine availability determination 1411 with engine emergency torque limit 1406 at 1419. In some embodiments, steady state engine torque limit 1422 for an engine may comprise a lower limit than dynamic engine torque limit 1424 for the engine.

Control allocation function 1420 may be configured to determine one or more allocated torque commands 1423. In some embodiments, one or more allocated torque commands 1423 may comprise one or more propeller torque commands. In some embodiments, control allocation function 1420 may be configured to determine one or more allocated torque commands 1423 based on at least one of steady state engine torque limit 1422, projected endurance at max takeoff torque 1408, or projected endurance at max emergency torque 1409.

DCPS 1430 may be configured to determine one or more engine torque commands 1432. In some embodiments, one or more engine torque commands 1432 may comprise one or more modified propeller torque commands. In some embodiments, DCPS 1430 may be configured to determine one or more engine torque commands 1432 based on at least one of allocated torque command 1423 or dynamic engine torque limit 1424.

Figure 15:
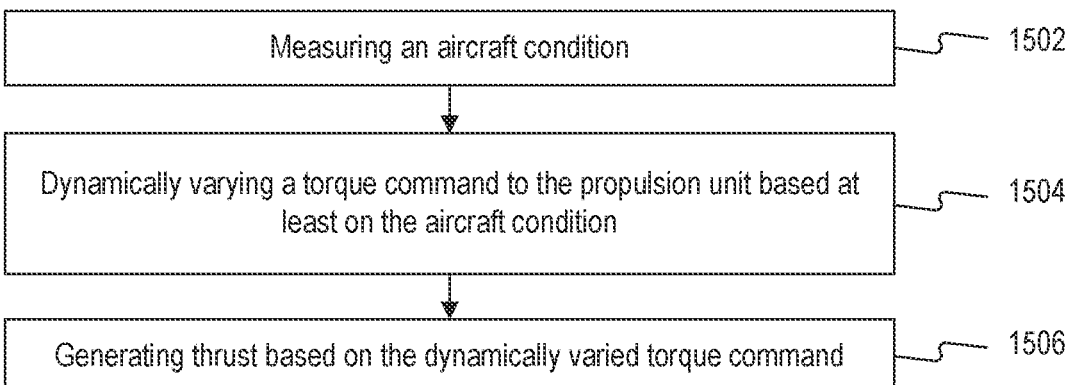
FIG. 15 illustrates an exemplary method for engine dynamics compensation, protection and stabilization of an aircraft, consistent with disclosed embodiments.

FIG. 15 is a flowchart illustrating an exemplary method for dynamics compensation, protection and stabilization of one or more propulsion units (e.g., electric propulsion units) of a particular machine (e.g., an aircraft), according to some embodiments of the present disclosure, thereby improving the technology of aircraft (e.g., aircraft safety, aircraft stability). The steps of method 1500 may be performable by, for example, system 1000 of FIG. 10, system 1100 of FIG. 11, or system 1400 of FIG. 14 executing on or otherwise using the components of any aircraft of FIG. 1-8, 9A-9E, 10, 11, 12A-12C, 13, 14 or 16A-16D or any electric or hybrid-electric aircraft comprising electric engines (e.g., a computer-implemented method). In some embodiments, the steps of method 1500 may be performable by one or more propulsion units of the particular machine (e.g., aircraft). The steps of method 1500 may be performed continuously (e.g., in real time) when one or more engines are active. It is appreciated that the illustrated method 1500 can be altered to modify the order of steps and to include additional steps.

In some embodiments, the aircraft of the disclosed embodiment may comprise a flight control computer not configured to independently control blade pitch of one or more propulsion units. Additionally or alternatively, one or more propulsion units may be configured to tilt between forward thrust and vertical lift configurations. Additionally or alternatively, for one or more propulsion units, a tilt angle of a propeller of a propulsion unit of the one or more propulsion units may be linked to a blade pitch of the propeller. Additionally or alternatively, one or more propulsion units may comprise one or more gearboxes. As used herein, a gearbox may refer to a set of gears configured to change a speed or torque of a motor or engine.

In step 1502, system 1100 may be configured to measure one or more aircraft conditions. In some embodiments, the one or more aircraft conditions may include at least one of an airspeed, an air density, a propeller speed for one or more propellers, a propeller airflow associated with one or more propellers, a tilt angle of one or more propulsion units, an airflow associated with a tilt angle of one or more propellers or propulsion units, a blade pitch of one or more propulsion units, or any measurable attribute associated with a current physical state of an aircraft or aircraft component. In some embodiments, the one or more aircraft conditions may be measured using one or more aircraft sensors. For example, the one or more aircraft sensors may comprise one or more sensors, placed internally or externally on the aircraft, configured to collect data related to the aircraft and the aircraft's surroundings. In some embodiments, the one or more aircraft conditions may be measured using remote sensing, such as satellite-based sensors or ground-based monitoring stations. In some embodiments, the one or more aircraft conditions may be measured using simulation data. For example, simulation data may include predetermined aircraft conditions based on at least one of expected scenarios or historic data. In some embodiments, the one or more aircraft conditions may be determined based on performance monitoring (e.g., fuel consumption, battery state, engine efficiency, etc.).

In step 1504, system 1100 may be configured to dynamically vary one or more torque commands to one or more propulsion units based on at least one of the one or more aircraft conditions. In some embodiments, the one or more torque commands may be based on (e.g., involve) one or more flight control laws. For example, the one or more torque commands may be output from one or more control allocation functions (e.g., control allocation 1029 of FIG. 10, inner loop control allocation 1124 of FIG. 11, or control allocation function 1420 of FIG. 14) configured to perform at least one of battery balancing or engine thermal balancing.

In some embodiments, the one or more torque commands may be based on one or more limits (e.g., torque limits, such as those discussed above with respect to FIG. 11). In some embodiments, one or more limits of the one or more limits may be generated by the flight control computer. In some embodiments, one or more limits of the one or more limits may be predetermined according to preset rules. For example, one or more limits of the one or more limits may be associated with preset regulations. In some embodiments, the one or more limits may include one or more limits related to (e.g., associated with, influencing, dependent upon, controlling) power transferred to or from one or more batteries (e.g., HV protection torque limit from FIG. 11). For example, the one or more limits may include at least one limit that is configured to limit (e.g., through an allocation model) power transferred to or from one or more batteries. Additionally or alternatively, the one or more limits may include at least one of a high speed protection limit or a low speed protection limit. Additionally or alternatively, the one or more limits may dynamically change based on a phase of flight.

In some embodiments, the one or more torque commands may be based on one or more fixed characteristics of the aircraft, which may include any physical part of the aircraft that does not change during flight, such as the examples discussed below. In some embodiments, the one or more fixed characteristics may include one or more of a fixed propeller limit (e.g., a maximum allowed or possible speed for one or more propellers, a minimum allowed or possible speed for one or more propellers) or a fixed propulsion unit limit (e.g., fixed characteristics of propeller, mass of motor, mass of propeller, engine specifications, and/or thermal limits). In some embodiments, the one or more fixed characteristics may include a position of each engine on the aircraft. In some embodiments, the one or more fixed characteristics may include a mass that is spinning (e.g., mass of each engine/motor and propeller). For example, the one or more torque commands may be based on a mass or inertia of a gearbox of a propulsion unit.

In some embodiments, dynamically varying one or more torque commands to one or more propulsion units may comprise generating one or more varied torque commands. A detailed description of dynamically varying one or more torque commands to one or more propulsion units is provided in FIG. 11 description above.

In step 1506, system 1100 may be configured to generate thrust based on the one or more dynamically varied torque commands. System 1100 may transmit a dynamically varied torque command to at least one propulsion unit (e.g., engine or motor). For example, system 1100 may transmit each dynamically varied torque command of one or more dynamically varied torque commands to its respective propulsion unit (e.g., engine or motor) to cause the respective propulsion unit to generate thrust according to the dynamically varied torque command, thereby increasing the responsiveness of one or more propulsion units. This may improve the safety, reliability, and quality of the flight of the aircraft by, without limitation, compensating for dynamics, protecting the aircraft structure (e.g., propeller protection, engine protection), and stabilizing the aircraft.

The inventors have observed, including in video form, phenomenon demonstrating the improvements to aircraft flight stability achieved through the disclosed embodiments. Some of these phenomenon are illustrated in the form of FIGS. 16A-16E, described below.

Figure 16A:
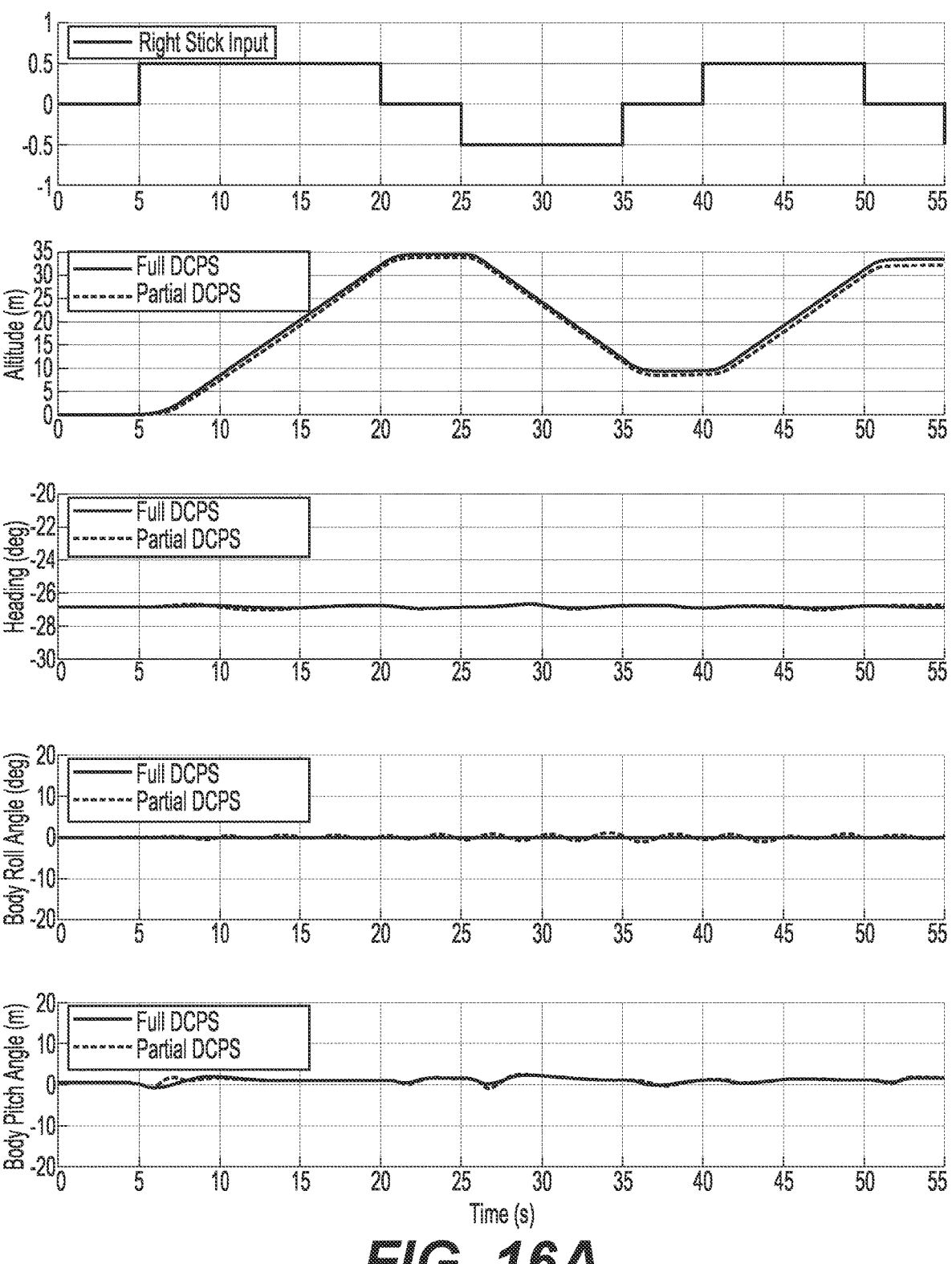
FIGS. 16A-16E illustrate exemplary effects related to engine dynamics compensation protection and stabilization of an aircraft, according to various disclosed embodiments.
Figure 16B:
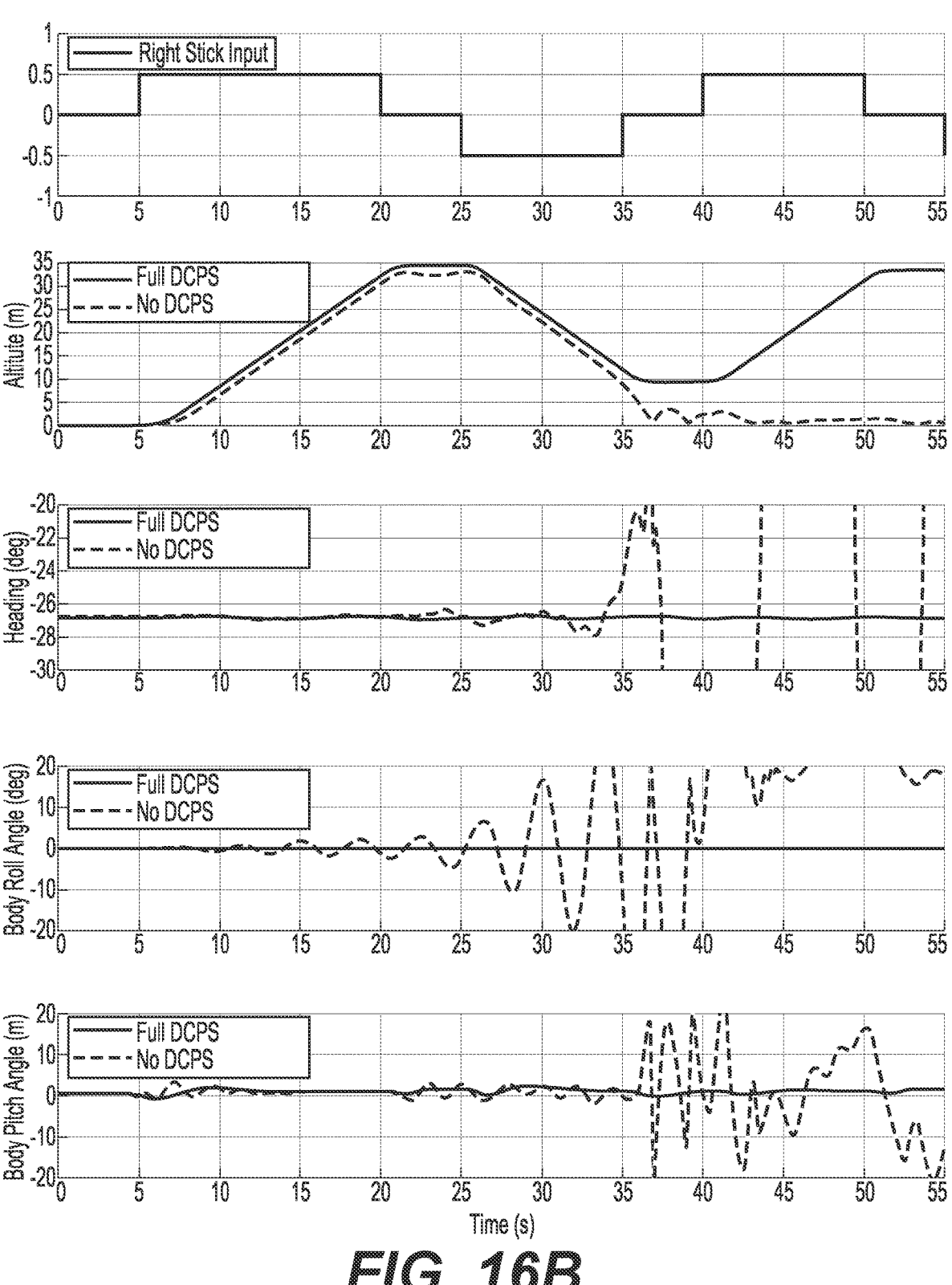
Figure 16C:
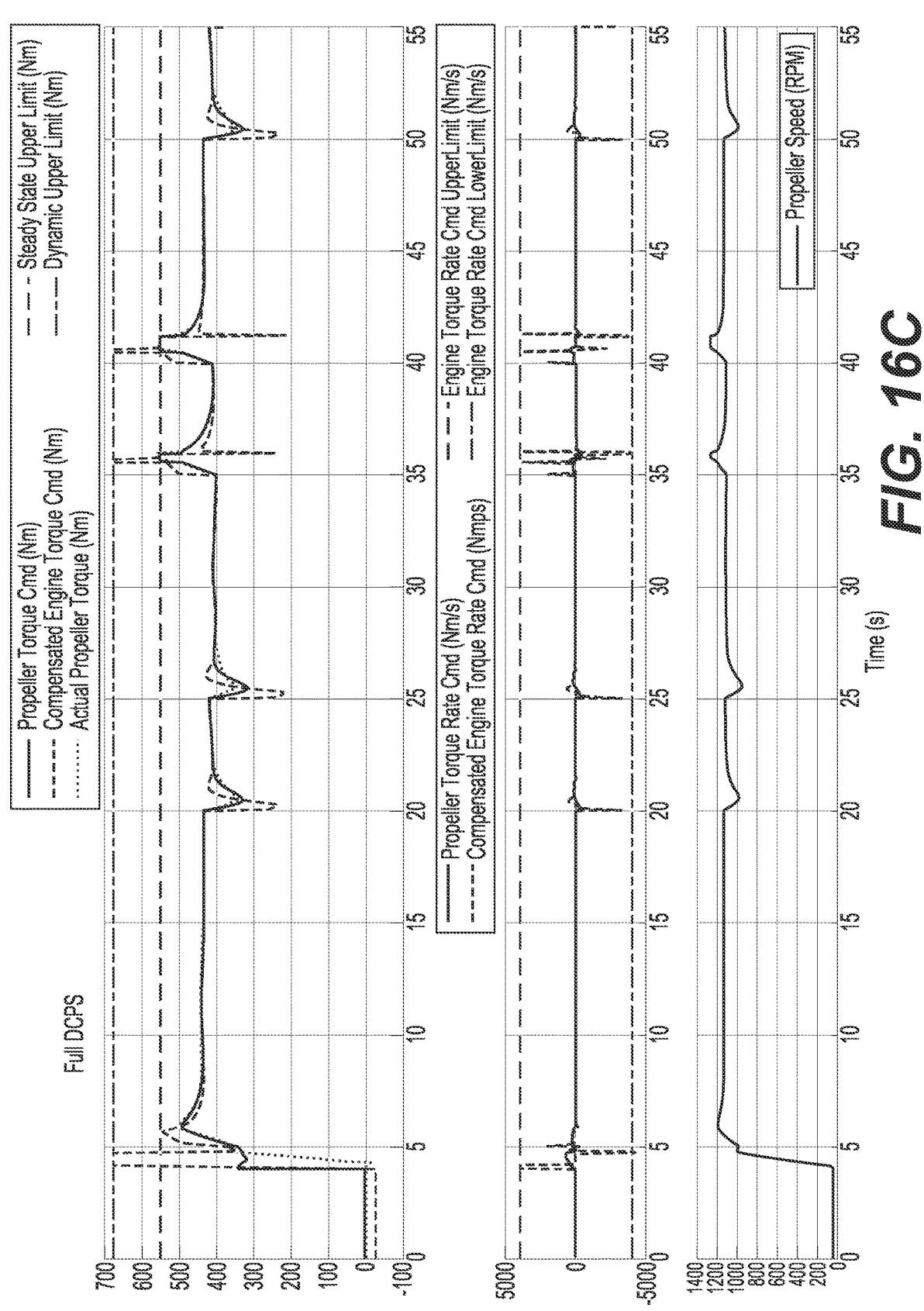
Figure 16D:
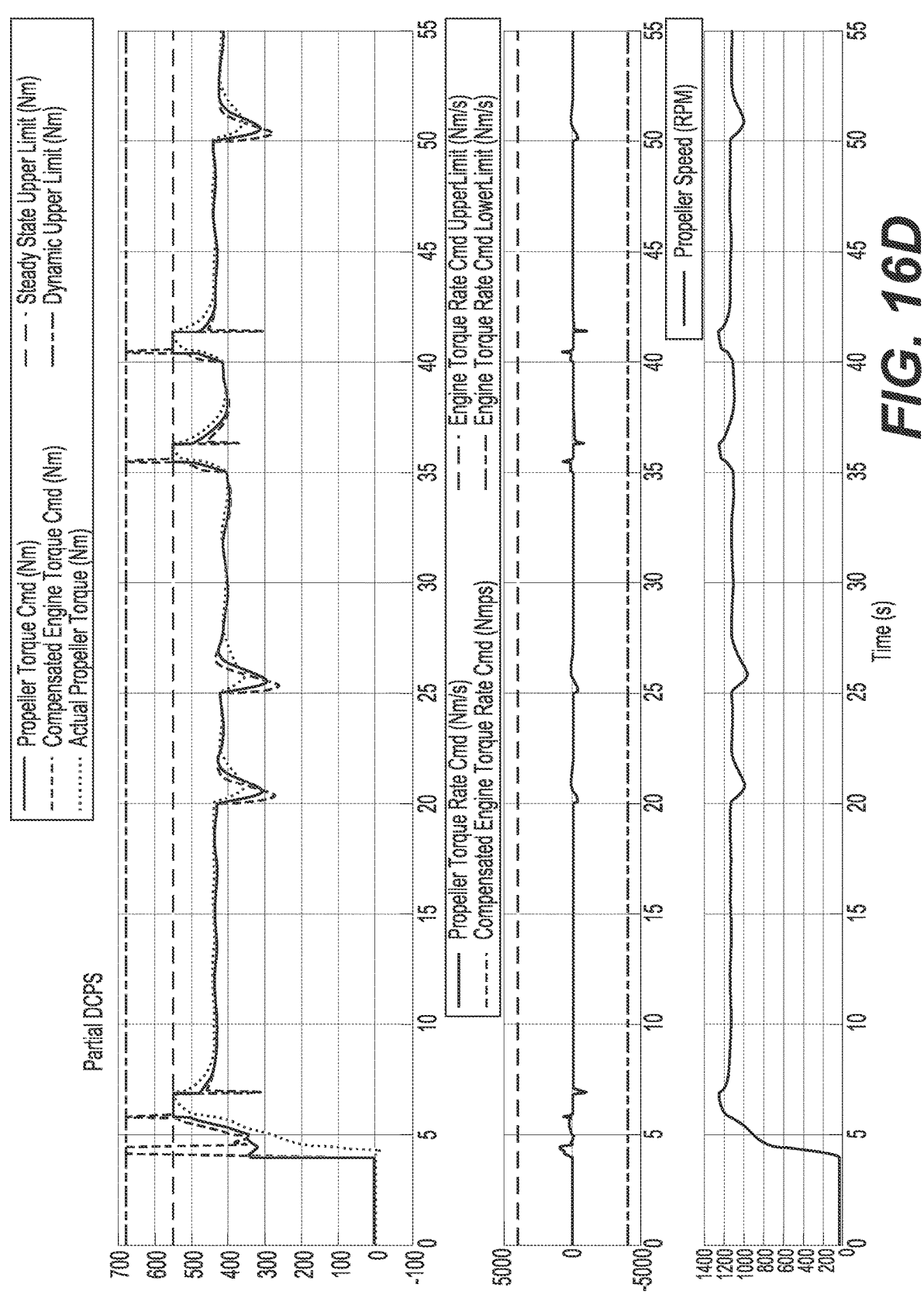
Figure 16E:
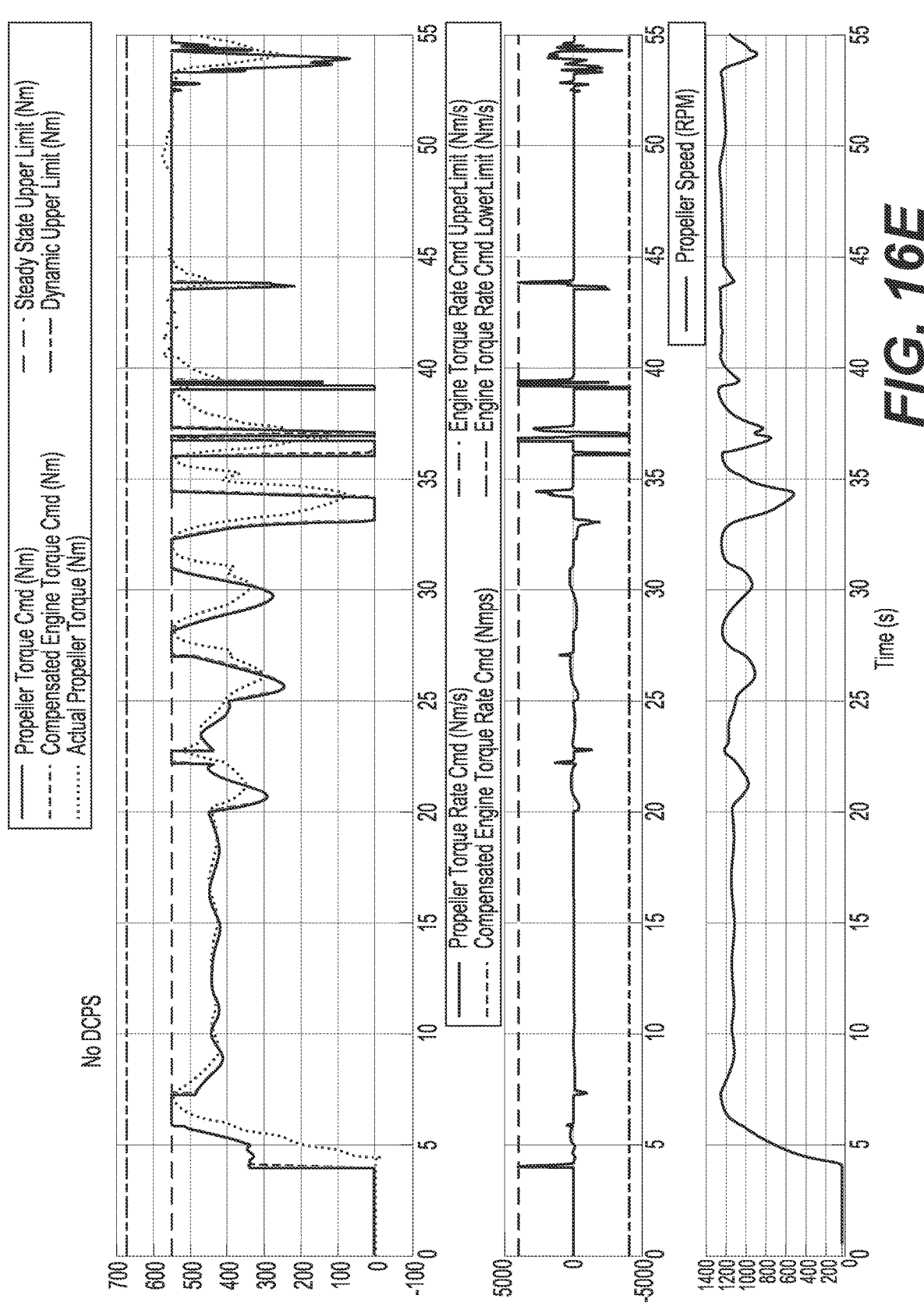

FIGS. 16A-16E illustrate exemplary test results, according to some embodiments of the present disclosure. Each of FIGS. 16A-16B illustrate results associated with an aircraft maneuvering by starting on the ground, taking off and climbing, holding, descending, holding, and climbing. Each of FIGS. 16C-16E illustrate results associated with an engine starting in a shut off configuration and generating thrust with no external disturbances (e.g., no turbulence or gusts).

FIGS. 16A-16B illustrate exemplary comparisons in altitude, heading, body roll angle, and body pitch angle between performing full propulsion unit DCPS, partial propulsion unit DCPS, and no DCPS. Full DCPS may correspond to DCPS as disclosed in previous embodiments. Partial propulsion unit DCPS may correspond to any level of DCPS that does not take into consideration all of the factors considered in full DCPS. In some embodiments, stability may be represented by flatter lines. As shown in FIG. 16A, partial DCPS may correspond to more oscillations and instability than full DCPS, but may provide sufficient stability to fly the aircraft. As shown in FIG. 16B, no DCPS may correspond to significant oscillations and instability, which may result in an inability to fly the aircraft.

FIGS. 16C-16E illustrate exemplary results for actual propeller torque output by an engine. The propeller torque command or propeller torque rate command may correspond to a command determined based on control laws (e.g., output of control allocation 1029 of FIG. 10, output of inner loop control allocation 1124 of FIG. 11, output of control allocation function 1420 of FIG. 14, torque command of FIG. 15). In some embodiments, the propeller torque command must be less than the steady state upper limit. The compensated engine torque command or compensated engine torque rate command may correspond to a compensated command determined by DCPS (e.g., output of DCPS 1033 of FIG. 10, output of engine DCPS function 1110 of FIG. 11, output of DCPS 1430 of FIG. 14, dynamically varied torque command of FIG. 15). In some embodiments, the compensated engine torque commands must be less than the dynamic upper limit. Actual propeller torque may correspond to an actual propeller torque determined by the engine. Steady state upper limit and dynamic upper limit may correspond to torque limits (e.g., steady state torque limits and dynamics torque limits of FIG. 11, steady state engine torque limit 1422 and dynamic engine torque limit 1424 of FIG. 14). In some embodiments, more overlap between propeller torque command and actual propeller torque may indicate improved compensation and stabilization. Initially, there may be a delay in producing propeller torque as the engine needs to warm up.

As shown in FIG. 16C, full DCPS may result in significant overlap between the propeller torque command and actual propeller torque once the engines have come up to speed.

As shown in FIG. 16D, partial DCPS may result in actual propeller torque lagging behind commanded propeller torque.

As shown in FIG. 16E, no DCPS may result in actual propeller torque significantly lagging behind commanded propeller torque, leading to instability.

Additional aspects of the present disclosure may be further described via the following clauses:

1. A computer-implemented method comprising:
dynamically varying one or more torque commands to one or more electric propulsion units based at least on one or more aircraft conditions, wherein the one or more aircraft conditions are measured by one or more sensors of an aircraft, and wherein the one or more dynamically varied torque commands are configured to cause one or more electric propulsion units of the aircraft to generate thrust according to the one or more dynamically varied torque commands.

2. The computer-implemented method of clause 1, wherein the method is performed by a processor not configured to independently control a blade pitch of each electric propulsion unit of the one or more electric propulsion units.

3. The computer-implemented method of any of clauses 1 and 2, wherein the method is performed by a flight control computer of the aircraft, and wherein the aircraft comprises a hybrid aircraft using at least one of an electric-based energy source or a fuel-based energy source to power the one or more electric propulsion units.

4. The computer-implemented method of any of clauses 1-3, wherein the one or more dynamically varied torque commands are based on one or more flight control laws.

5. The computer-implemented method of any of clauses 1-4, wherein the one or more dynamically varied torque commands are based on one or more torque limits.

6. The computer-implemented method of any of clauses 1-5, wherein the one or more dynamically varied torque commands are based on a high-voltage protection torque limit related to power transferred to or from one or more batteries of the aircraft.

7. The computer-implemented method of any of clauses 1-6, wherein the method is performed by a flight control computer of the aircraft, and wherein the one or more dynamically varied torque commands are based on one or more torque limits generated by the flight control computer.

8. The computer-implemented method of any of clauses 1-7, wherein the one or more dynamically varied torque commands are based on at least one of a high speed protection limit or a low speed protection limit associated with a speed of a propeller of each electric propulsion unit of the one or more electric propulsion units.

9. The computer-implemented method of any of clauses 1-8, wherein the one or more dynamically varied torque commands are based on one or more torque limits associated with a phase of flight.

10. The computer-implemented method of any of clauses 1-9, wherein the one or more dynamically varied torque commands are based on one or more fixed characteristics of the aircraft.

11. The computer-implemented method of any of clauses 1-10, wherein the one or more dynamically varied torque commands are based on at least one of a fixed propeller limit or a fixed propulsion unit limit.

12. The computer-implemented method of any of clauses 1-11, wherein the one or more dynamically varied torque commands are based on a mass of a gearbox of each electric propulsion unit of the one or more electric propulsion units.

13. The computer-implemented method of any of clauses 1-12, wherein the one or more dynamically varied torque commands are based on one or more of a high-voltage protection torque limit related to power transferred to or from one or more batteries, one or more flight control laws, one or more torque limits, a high speed protection limit, a low speed protection limit, one or more fixed characteristics of the aircraft, or a mass of a gearbox of each electric propulsion unit of the one or more electric propulsion units.

14. The computer-implemented method of any of clauses 1-13, wherein the one or more aircraft conditions include at least one of an airspeed, air density, propeller speed, or propeller airflow.

15. The computer-implemented method of any of clauses 1-14, wherein the method is performed by at least one processor configured to execute instructions to cause the one or more electric propulsion units to tilt between forward thrust and vertical lift configurations.

16. The computer-implemented method of any of clauses 1-15, wherein the one or more aircraft conditions include one or more tilt angles associated with the one or more electric propulsion units.

17. The computer-implemented method of any of clauses 1-16, wherein the one or more aircraft conditions include one or more tilt angles associated with the one or more electric propulsion units, and wherein each tilt angle is linked to a pitch associated with an electric propulsion unit of the one or more electric propulsion units.

18. The computer-implemented method of any of clauses 1-17, wherein the one or more aircraft conditions include an airflow associated with a tilt angle of each electric propulsion unit of the one or more electric propulsion units.

19. The computer-implemented method of any of clauses 1-18, wherein the one or more aircraft conditions include a blade pitch of each electric propulsion unit of the one or more electric propulsion units.

20. A flight control computer comprising:
one or more memory devices storing processor-executable instructions; and
one or more processors configured to execute the instructions to cause the flight control computer to perform any of clauses 1-19.

21. A non-transitory computer-readable medium having stored thereon computer-readable instructions that, when executed by at least one processor, cause the at least one processor to execute the computer-implemented method of any of clauses 1-19.

22. A propulsion unit comprising:
one or more memory devices storing processor-executable instructions; and
one or more processors configured to execute instructions to cause the propulsion unit to perform any of clauses 1-19.

23. An aircraft comprising:
one or more electric propulsion units;
one or more sensors configured to measure one or more aircraft conditions; and
at least one flight control computer configured to perform any of clauses 1-19.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the inventions disclosed herein, including combinations of aspects from different embodiments.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent to those skilled in the art from consideration of the specification and practice of the implementations disclosed herein. It is intended that the architectures and circuit arrangements shown in figures are only for illustrative purposes and are not intended to be limited to the specific arrangements and circuit arrangements as described and shown in the figures. It is also intended that the specification and examples be considered as exemplary only, with the true scope and spirit of the invention being indicated by the following claims. The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the inventions disclosed herein.

What is claimed is:

1. An aircraft, comprising:
   one or more electric propulsion units;
   one or more sensors configured to measure one or more aircraft conditions; and
   at least one flight control computer configured to perform a preemptive action to dynamically vary one or more torque commands to the one or more electric propulsion units based at least on the one or more aircraft conditions and using at least one of an engine or propeller characteristic to preemptively account for limitations of the one or more electric propulsion units, wherein the at least one of an engine or propeller characteristic comprises at least one of a rotating component inertia, an aerodynamic characteristic of a propeller, or an incidence angle of air around a propeller, and wherein the one or more electric propulsion units are configured to generate thrust based on the one or more dynamically varied torque commands.

2. The aircraft of claim 1, wherein the at least one flight control computer is configured to adjust, but not configured to independently control, a blade pitch of the one or more electric propulsion units.

3. The aircraft of claim 1, wherein the aircraft is a hybrid aircraft using an electric-based energy source and a fuel-based energy source to power the one or more electric propulsion units.

4. The aircraft of claim 1, wherein the one or more dynamically varied torque commands are determined based on one or more flight control laws.

5. The aircraft of claim 1, wherein the one or more dynamically varied torque commands are based on power transferred to or from one or more batteries of the aircraft.

6. The aircraft of claim 1, wherein the one or more dynamically varied torque commands are generated by the at least one flight control computer.

7. The aircraft of claim 1, wherein the one or more dynamically varied torque commands are based on at least one of a high speed protection limit or a low speed protection limit associated with a speed of a propeller of each electric propulsion unit of the one or more electric propulsion units.

8. The aircraft of claim 1, wherein the one or more dynamically varied torque commands are based on a phase of flight.

9. The aircraft of claim 1, wherein the one or more torque commands are dynamically varied based on one or more fixed characteristics of the aircraft.

10. The aircraft of claim 9, wherein the one or more fixed characteristics include at least one of a fixed propeller limit or a fixed propulsion unit limit.

11. The aircraft of claim 9, wherein the one or more fixed characteristics include a mass of a gearbox of each electric propulsion unit of the one or more electric propulsion units.

12. The aircraft of claim 1, wherein the one or more aircraft conditions include at least one of an airspeed, air density, propeller speed, or propeller airflow.

13. The aircraft of claim 1, wherein the at least one flight control computer is configured to cause the one or more electric propulsion units to tilt between forward thrust and vertical lift configurations.

14. The aircraft of claim 13, wherein the one or more aircraft conditions include one or more tilt angles associated with the one or more electric propulsion units.

15. The aircraft of claim 14, wherein each tilt angle of the one or more tilt angles is linked to a blade pitch associated with an electric propulsion unit of the one or more electric propulsion units.

16. The aircraft of claim 13, wherein the one or more aircraft conditions include an airflow associated with a tilt angle of each electric propulsion unit of the one or more electric propulsion units.

17. The aircraft of claim 13, wherein the one or more aircraft conditions include a blade pitch of each electric propulsion unit of the one or more electric propulsion units.

18. The aircraft of claim 1, wherein the one or more dynamically varied torque commands are based on at least one of: an engine torque rate limit, a battery power limit, an HV bus power limit, or a battery temperature.

19. The aircraft of claim 1, wherein the one or more dynamically varied torque commands are dynamically varied in flight.

20. The aircraft of claim 1, wherein the one or more dynamically varied torque commands are based on at least one pilot input.

21. The aircraft of claim 1, wherein the one or more aircraft conditions include an air density.

22. The aircraft of claim 1, wherein the one or more aircraft conditions is based on a propeller acceleration constraint.

23. The aircraft of claim 1, wherein the one or more torque commands are dynamically compensated torque commands.

24. The aircraft of claim 23, wherein the dynamically compensated torque commands preemptively account for limitations of at least one of the one or more electric propulsion units.

25. The aircraft of claim 1, wherein the one or more dynamically varied torque commands are based on a difference between a steady state condition and a dynamic condition.

26. The aircraft of claim 1, wherein the one or more dynamically varied torque commands are based on a dynamics compensation gain component.

27. The aircraft of claim 26, wherein the dynamics compensation gain component is determined based on at least one of a mass of the one or more electric propulsion units, a density ratio, or a torque margin.

28. The aircraft of claim 1, wherein the preemptive action is determined based on a propeller speed protection function.

29. The aircraft of claim 28, wherein the propeller speed protection function is determined based on a propeller acceleration limit.

30. The aircraft of claim 28, wherein the propeller speed protection function is determined based on a propeller minimum speed protection limit.

31. The aircraft of claim 28, wherein the propeller speed protection function is determined based on a propeller maximum speed protection limit.

32. The aircraft of claim 1, wherein the aircraft conditions comprise an air density.

33. A computer-implemented method comprising, measuring one or more aircraft conditions;

performing a preemptive action to dynamically vary one or more torque commands to one or more electric propulsion units based at least on the one or more aircraft conditions and using at least one of an engine or propeller characteristic to preemptively account for limitations of the one or more electric propulsion units; wherein the at least one of an engine or propeller characteristic comprises at least one of a rotating component inertia, an aerodynamic characteristic of a propeller, or an incidence angle of air around a propeller; and causing the one or more electric propulsion units to generate thrust based on the one or more dynamically varied torque commands from a flight control computer of an aircraft.

34. A non-transitory computer-readable medium storing one or more instructions that, when executed by at least one processor, cause the at least one processor to perform operations comprising:

measuring one or more aircraft conditions;

performing a preemptive action to dynamically vary one or more torque commands to one or more electric propulsion units based at least on the one or more aircraft conditions and using at least one of an engine or propeller characteristic to preemptively account for limitations of the one or more electric propulsion units; wherein the at least one of an engine or propeller characteristic comprises at least one of a rotating component inertia, an aerodynamic characteristic of a propeller, or an incidence angle of air around a propeller; and causing the one or more electric propulsion units to generate thrust based on the one or more dynamically varied torque commands.

* * * * *